(12) United States Patent
Luna

(10) Patent No.: US 10,210,739 B2
(45) Date of Patent: Feb. 19, 2019

(54) PROXIMITY-BASED CONTROL OF MEDIA DEVICES

(71) Applicant: Michael Edward Smith Luna, San Jose, CA (US)

(72) Inventor: Michael Edward Smith Luna, San Jose, CA (US)

( * ) Notice: Subject to any disclaimer, the term of this patent is extended or adjusted under 35 U.S.C. 154(b) by 0 days.

(21) Appl. No.: 14/640,013

(22) Filed: Mar. 5, 2015

(65) Prior Publication Data
US 2016/0035210 A1    Feb. 4, 2016

Related U.S. Application Data

(63) Continuation of application No. 13/831,422, filed on Mar. 14, 2013, now abandoned.

(51) Int. Cl.
*G08B 21/18* (2006.01)
*H04M 1/725* (2006.01)
*H04M 1/22* (2006.01)

(52) U.S. Cl.
CPC .......... *G08B 21/18* (2013.01); *H04M 1/7253* (2013.01); *H04M 1/22* (2013.01); *H04M 2250/12* (2013.01)

(58) Field of Classification Search
CPC .......... H04W 4/001–4/18; H04W 8/22; G08B 21/18; H04M 1/7253; H04M 1/22; H04M 2250/12
USPC .......... 340/691.4–691.6, 692, 407.1, 539.11, 340/539.13, 686.6; 455/414.1, 456.1, 455/456.3, 456.6
See application file for complete search history.

(56) References Cited

U.S. PATENT DOCUMENTS

| | | | | |
|---|---|---|---|---|
| 2005/0219228 | A1* | 10/2005 | Alameh | G06F 1/1626 345/173 |
| 2006/0259623 | A1* | 11/2006 | Crawford | H04L 67/2842 709/226 |
| 2008/0201658 | A1* | 8/2008 | Saito | H04B 1/207 715/772 |
| 2010/0238041 | A1* | 9/2010 | Acedo et al. | G06T 3/40 340/686.6 |
| 2012/0075101 | A1* | 3/2012 | Austin et al. | G01P 13/00 340/572.1 |
| 2012/0310391 | A1* | 12/2012 | Sanders | G06F 3/011 700/94 |

(Continued)

*Primary Examiner* — Thomas Mullen

(57) ABSTRACT

Embodiments relate generally to electrical/electronic hardware, computer software, wired and wireless network communications, portable, wearable, and stationary media devices. Media devices may include a plurality of RF transceivers, an audio system, and a proximity detection system. The RF transceivers and/or audio system may be used to wirelessly communicate between media devices and allow configuration and other data to be wirelessly transmitted from one media device to another media device. The proximity detection system may be configured to detect a presence of a user or multiple users and upon detecting presence, take some action defined by a user preference and/or environmental conditions around the media device. One or more user devices in proximity of the media device post detection may wirelessly communicate with the media device and the media device may orchestrate handling of content from those devices or from a wirelessly accessible location such as the Cloud or Internet.

20 Claims, 15 Drawing Sheets

(56) References Cited

U.S. PATENT DOCUMENTS

2013/0045681 A1* 2/2013 Dua .................. G06F 17/30058
　　　　　　　　　　　　　　　　　　　　　455/41.1
2013/0252730 A1* 9/2013 Joshi .................. G06Q 30/0257
　　　　　　　　　　　　　　　　　　　　　463/31

* cited by examiner

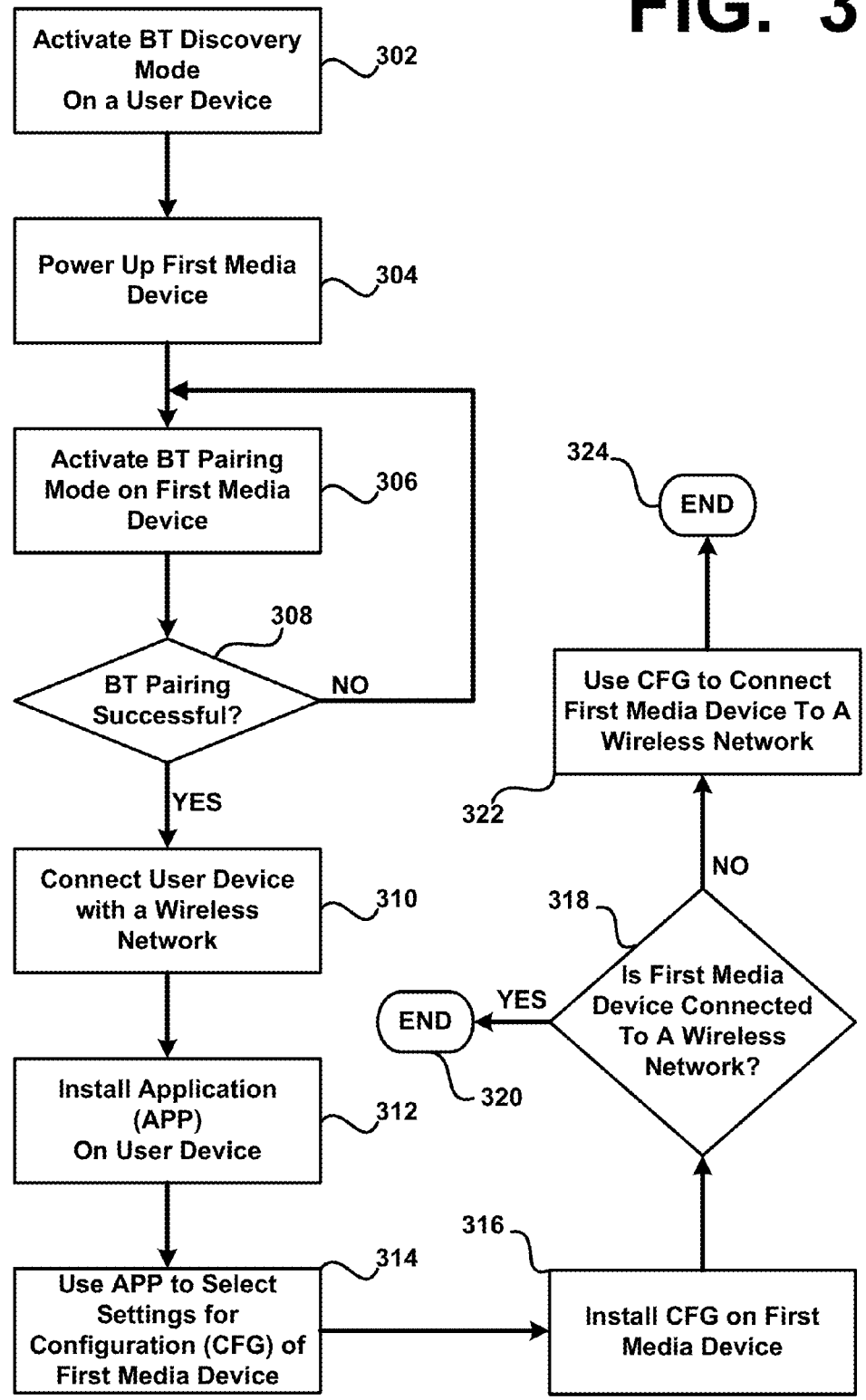

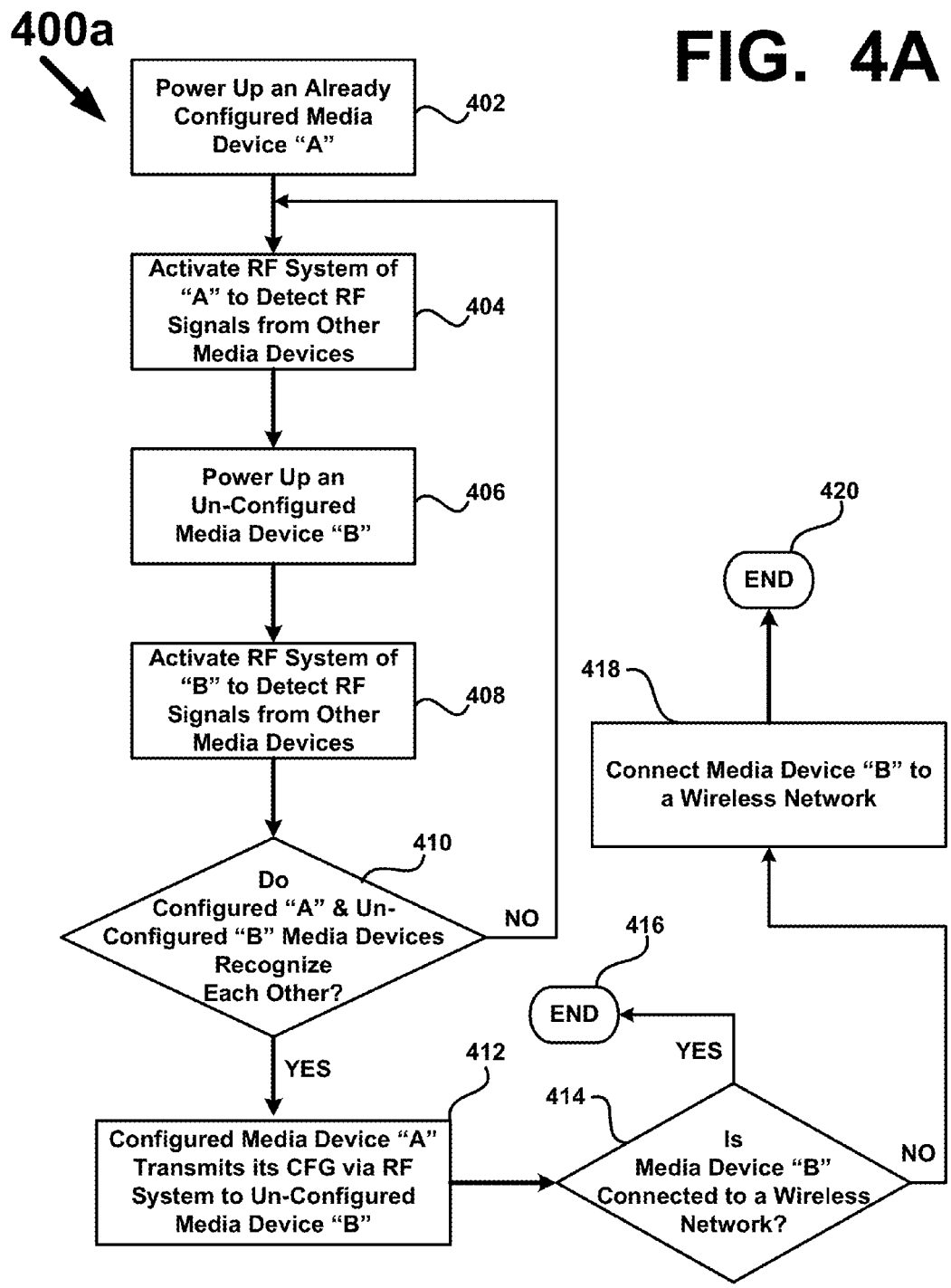

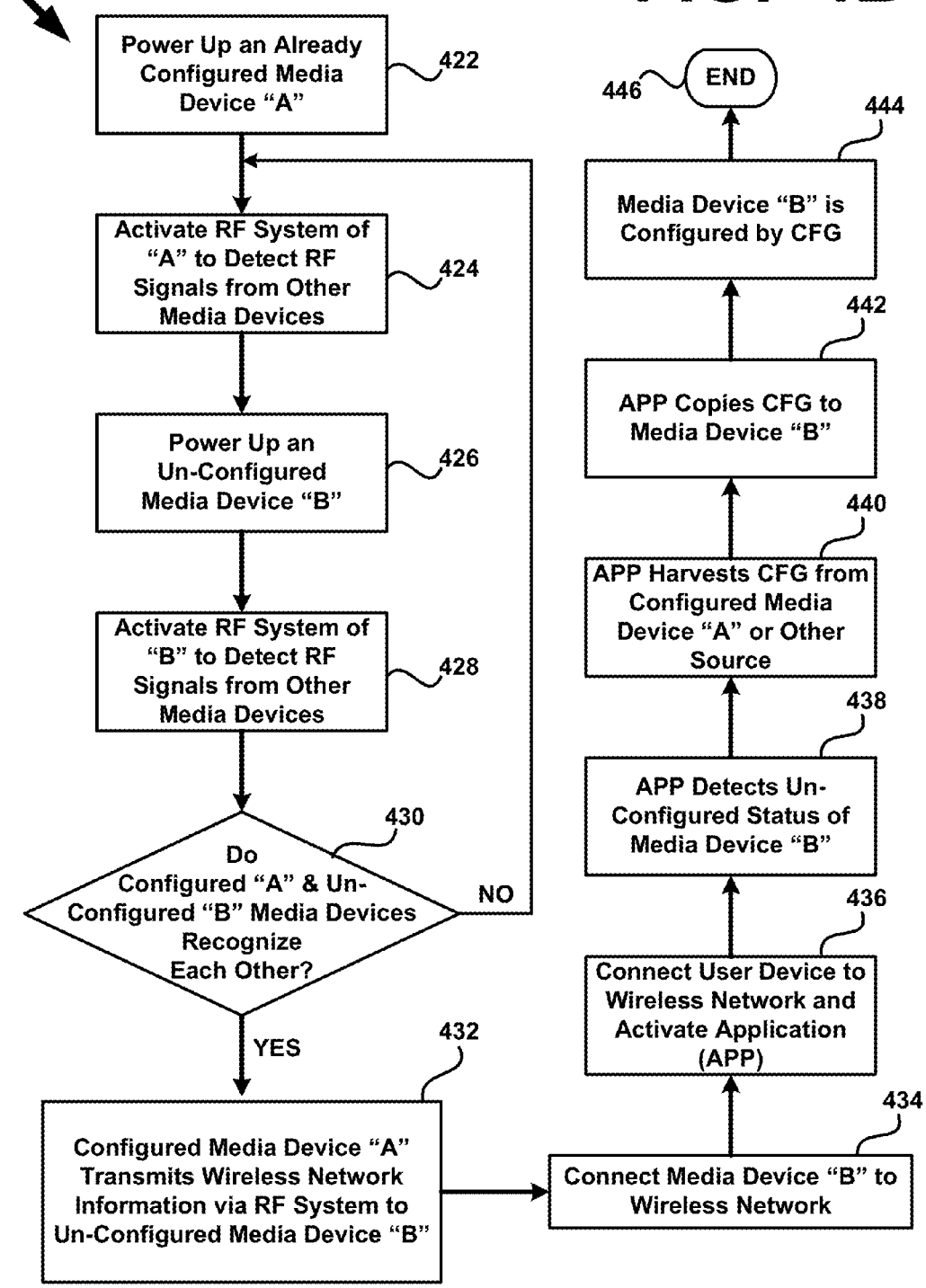

PROXIMITY-BASED CONTROL OF MEDIA DEVICES

CROSS-REFERENCE TO RELATED APPLICATIONS

This application is a continuation of co-pending U.S. patent application Ser. No. 13/831,422 filed on Mar. 14, 2013 and entitled, "Proximity Based Control of Media Devices", U.S. patent application Ser. No. 13/831,422 is related to the following applications: U.S. patent application Ser. No. 13/802,646 filed on Mar. 13, 2013 and entitled "Proximity-Based Control Of Media Devices For Media Presentations", and to U.S. patent application Ser. No. 13/802,674 filed on Mar. 13, 2013 and entitled "Proximity And Interface Controls Of Media Devices For Media Presentations", all of which are hereby incorporated by reference in their entirety for all purposes.

FIELD

Embodiments of the present application relate generally to electrical and electronic hardware, computer software, wired and wireless network communications, wearable, hand held, and portable computing devices for facilitating communication of information. More specifically, disclosed are media devices that detect proximity of users and/or user devices and take actions and handle content after detecting presence of users and/or user devices.

BACKGROUND

Conventional paradigms for media devices require a user to take some action using a finger press to a touch screen or press a button, or the like, in order to initiate some function on the device, such as listening to music, for example. Conventional media devices are not configured to recognize and act on user preferences as to how the media device serves the user's needs based on changing circumstances and changing environments the user and media device are subject to. Furthermore, conventional media devices are typically personal devices that are mostly if not always used solely by the user and are therefore not well adapted to servicing the needs of friends, guests, or the like who may want to share content on their devices with the user.

Thus, there is a need for devices, systems, methods, and software that allow a user to configure (e.g., wirelessly) a media device to detect a user's presence, take an action based on the user's presence, and allow for content from a user device or many devices to be handled based on their proximity to the media device.

BRIEF DESCRIPTION OF THE DRAWINGS

Various embodiments or examples ("examples") of the present application are disclosed in the following detailed description and the accompanying drawings. The drawings are not necessarily to scale:

FIG. 3 depicts one example of a flow diagram of a process for installing an application on a user device and configuring a first media device using the application according to an embodiment of the present application;

FIGS. 4A and 4B depict example flow diagrams for processes for configuring an un-configured media device according to embodiments of the present application;

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
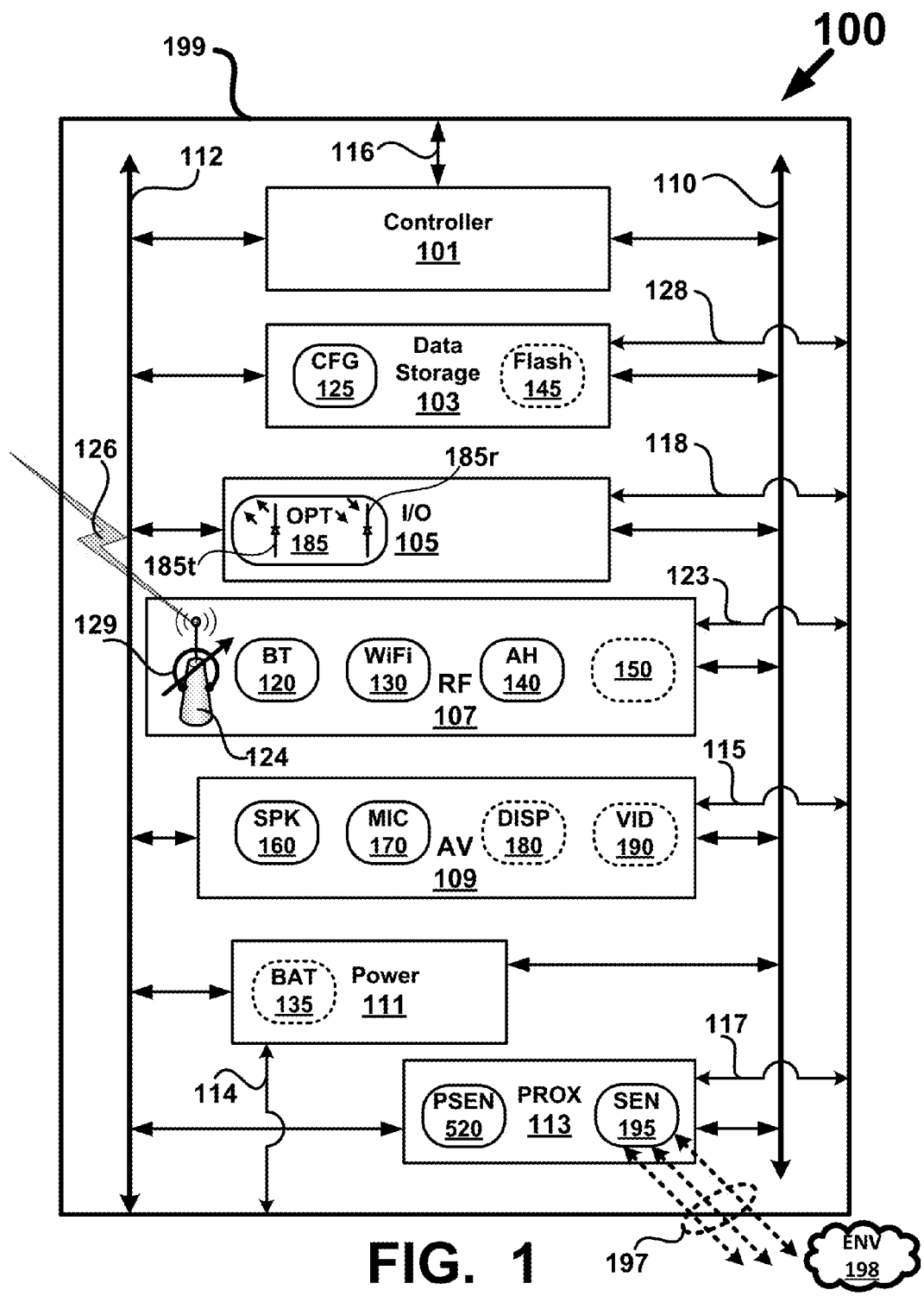
FIG. 1 depicts a block diagram of one example of a media device according to an embodiment of the present application.

FIG. 1 depicts a block diagram of one embodiment of a media device 100 having systems including but not limited to a controller 101, a data storage (DS) system 103, a input/output (I/O) system 105, a radio frequency (RF) system 107, an audio/video (A/V) system 109, a power system 111, and a proximity sensing (PROX) system 113. A bus 110 enables electrical communication between the controller 101, DS system 103, I/O system 105, RF system 107, AV system 109, power system 111, and PROX system 113. Power bus 112 supplies electrical power from power system 111 to the controller 101, DS system 103, I/O system 105, RF system 107, AV system 109, and PROX system 113.

Power system 111 may include a power source internal to the media device 100 such as a battery (e.g., AAA or AA batteries) or a rechargeable battery (e.g., such as a lithium ion or nickel metal hydride type battery, etc.) denoted as BAT 135. Power system 111 may be electrically coupled with a port 114 for connecting an external power source (not shown) such as a power supply that connects with an external AC or DC power source. Examples include but are not limited to a wall wart type of power supply that converts AC power to DC power or AC power to AC power at a different voltage level. In other examples, port 114 may be a connector (e.g., an IEC connector) for a power cord that plugs into an AC outlet or other type of connector, such as a universal serial bus (USB) connector. Power system 111 provides DC power for the various systems of media device 100. Power system 111 may convert AC or DC power into a form usable by the various systems of media device 100. Power system 111 may provide the same or different voltages to the various systems of media device 100. In applications where a rechargeable battery is used for BAT 135, the external power source may be used to power the power system 111, recharge BAT 135, or both. Further, power system 111 on its own or under control of controller 101 may be configured for power management to reduce power consumption of media device 100, by for example, reducing or disconnecting power from one or more of the systems in media device 100 when those systems are not in use or are placed in a standby or idle mode. Power system 111 may also be configured to monitor power usage of the various systems in media device 100 and to report that usage to other systems in media device 100 and/or to other devices (e.g., including other media devices 100) using one or more of the I/O system 105, RF system 107, and AV system 109, for example. Operation and control of the various functions of power system 111 may be externally controlled by other devices (e.g., including other media devices 100).

Controller 101 controls operation of media device 100 and may include a non-transitory computer readable medium, such as executable program code to enable control and operation of the various systems of media device 100. DS 103 may be used to store executable code used by controller 101 in one or more data storage mediums such as ROM, RAM, SRAM, RAM, SSD, Flash, etc., for example. Controller 101 may include but is not limited to one or more of a microprocessor (μP), a microcontroller (μC), a digital signal processor (DSP), a baseband processor, an application specific integrated circuit (ASIC), just to name a few. Processors used for controller 101 may include a single core or multiple cores (e.g., dual core, quad core, etc.). Port 116 may be used to electrically couple controller 101 to an external device (not shown).

DS system 103 may include but is not limited to non-volatile memory (e.g., Flash memory), SRAM, DRAM, ROM, SSD, just to name a few. In that the media device 100 in some applications is designed to be compact, portable, or to have a small size footprint, memory in DS 103 will typically be solid state memory (e.g., no moving or rotating components); however, in some application a hard disk drive (HDD) or hybrid HDD may be used for all or some of the memory in DS 103. In some examples, DS 103 may be electrically coupled with a port 128 for connecting an external memory source (e.g., USB Flash drive, SD, SDHC, SDXC, microSD, Memory Stick, CF, SSD, etc.). Port 128 may be a USB or mini USB port for a Flash drive or a card slot for a Flash memory card. In some examples as will be explained in greater detail below, DS 103 includes data storage for configuration data, denoted as CFG 125, used by controller 101 to control operation of media device 100 and its various systems. DS 103 may include memory designated for use by other systems in media device 100 (e.g., MAC addresses for WiFi 130, network passwords, data for settings and parameters for A/V 109, and other data for operation and/or control of media device 100, etc.). DS 103 may also store data used as an operating system (OS) for controller 101. If controller 101 includes a DSP, then DS 103 may store data, algorithms, program code, an OS, etc. for use by the DSP, for example. In some examples, one or more systems in media device 100 may include their own data storage systems.

I/O system 105 may be used to control input and output operations between the various systems of media device 100 via bus 110 and between systems external to media device 100 via port 118. Port 118 may be a connector (e.g., USB, HDMI, Ethernet, fiber optic, Toslink, Firewire, IEEE 1394, or other) or a hard wired (e.g., captive) connection that facilitates coupling I/O system 105 with external systems. In some examples port 118 may include one or more switches, buttons, or the like, used to control functions of the media device 100 such as a power switch, a standby power mode switch, a button for wireless pairing, an audio muting button, an audio volume control, an audio mute button, a button for connecting/disconnecting from a WiFi network, an infrared (IR) transceiver, just to name a few. I/O system 105 may also control indicator lights, audible signals, or the like (not shown) that give status information about the media device 100, such as a light to indicate the media device 100 is powered up, a light to indicate the media device 100 is in wireless communication (e.g., WiFi, Bluetooth®, WiMAX, cellular, etc.), a light to indicate the media device 100 is Bluetooth® paired, in Bluetooth® pairing mode, Bluetooth® communication is enabled, a light to indicate the audio and/or microphone is muted, just to name a few. Audible signals may be generated by the I/O system 105 or via the AV system 107 to indicate status, etc. of the media device 100. Audible signals may be used to announce Bluetooth® status, powering up or down the media device 100, muting the audio or microphone, an incoming phone call, a new message such as a text, email, or SMS, just to name a few. In some examples, I/O system 105 may use optical technology to wirelessly communicate with other media devices 100 or other devices. Examples include but are not limited to infrared (IR) transmitters, receivers, transceivers, an IR LED, and an IR detector, just to name a few. I/O system 105 may include an optical transceiver OPT 185 that includes an optical transmitter 185$t$ (e.g., an IR LED) and an optical receiver 185$r$ (e.g., a photo diode). OPT 185 may include the circuitry necessary to drive the optical transmitter 185$t$ with encoded signals and to receive and decode signals received by the optical receiver 185$r$. Bus 110 may be used to communicate signals to and from OPT 185. OPT 185 may be used to transmit and receive IR commands consistent with those used by infrared remote controls used to control AV equipment, televisions, computers, and other types of systems and consumer electronics devices. The IR commands may be used to control and configure the media device 100, or the media device 100 may use the IR commands to configure/re-configure and control other media devices or other user devices, for example.

RF system 107 includes at least one RF antenna 124 that is electrically coupled with a plurality of radios (e.g., RF transceivers) including but not limited to a Bluetooth® (BT) transceiver 120, a WiFi transceiver 130 (e.g., for wireless communications over a wireless and/or WiMAX network), and a proprietary Ad Hoc (AH) transceiver 140 pre-configured (e.g., at the factory) to wirelessly communicate with a proprietary Ad Hoc wireless network (AH-WiFi) (not shown). AH 140 and AH-WiFi are configured to allow wireless communications between similarly configured media devices (e.g., an ecosystem comprised of a plurality of similarly configured media devices) as will be explained in greater detail below. RF system 107 may include more or fewer radios than depicted in FIG. 1 and the number and type of radios will be application dependent. Furthermore, radios in RF system 107 need not be transceivers, RF system 107 may include radios that transmit only or receive only, for example. Optionally, RF system 107 may include a radio 150 configured for RF communications using a proprietary format, frequency band, or other format or frequency band existent now or to be implemented in the future. Radio 150 may be used for cellular communications (e.g., 3G, 4G, or other), for example. Antenna 124 may be configured to be a de-tunable antenna such that it may be de-tuned 129 over a wide range of RF frequencies including but not limited to licensed bands, unlicensed bands, WiFi, WiMAX, cellular bands, Bluetooth®, from about 2.0 GHz to about 6.0 GHz range, and broadband, just to name a few. As will be discussed below, PROX system 113 may use the de-tuning 129 capabilities of antenna 124 to sense proximity of the user, other people, the relative locations of other media devices 100, just to name a few. Radio 150 (e.g., a transceiver) or other transceiver in RF system 107, may be used in conjunction with the de-tuning capabilities of antenna 124 to sense proximity, to detect and or spatially locate other RF sources such as those from other media devices 100, devices of a user, just to name a few. RF system 107 may include a port 123 configured to connect the RF system 107 with an external component or system, such as an external RF antenna, for example. The transceivers depicted in FIG. 1 are non-limiting examples of the type of transceivers that may be included in RF system 107. RF system 107 may include a first transceiver configured to wirelessly communicate using a first protocol, a second transceiver configured to wirelessly communicate using a second protocol, a third transceiver configured to wirelessly communicate using a third protocol, and so on. One of the transceivers in RF system 107 may be configured for short range RF communications, such as within a range from about 1 meter to about 15 meters, or less, for example. Another one of the transceivers in RF system 107 may be configured for long range RF communications, such any range up to about 50 meters or more, for example. Short range RF may include Bluetooth®; whereas, long range RF may include WiFi, WiMAX, cellular, and Ad Hoc wireless, for example.

AV system 109 includes at least one audio transducer, such as a loud speaker 160, a microphone 170, or both. AV system 109 further includes circuitry such as amplifiers, preamplifiers, or the like as necessary to drive or process signals to/from the audio transducers. Optionally, AV system 109 may include a display (DISP) 180, video device (VID) 190 (e.g., an image capture device or a web CAM, etc.), or both. DISP 180 may be a display and/or touch screen (e.g., a LCD, OLED, or flat panel display) for displaying video media, information relating to operation of media device 100, content available to or operated on by the media device 100, playlists for media, date and/or time of day, alphanumeric text and characters, caller ID, file/directory information, a GUI, just to name a few. A port 122 may be used to electrically couple AV system 109 with an external device and/or external signals. Port 122 may be a USB, HDMI, Firewire/IEEE-1394, 3.5 mm audio jack, or other. For example, port 122 may be a 3.5 mm audio jack for connecting an external speaker, headphones, earphones, etc. for listening to audio content being processed by media device 100. As another example, port 122 may be a 3.5 mm audio jack for connecting an external microphone or the audio output from an external device. In some examples, SPK 160 may include but is not limited to one or more active or passive audio transducers such as woofers, concentric drivers, tweeters, super tweeters, midrange drivers, sub-woofers, passive radiators, just to name a few. MIC 170 may include one or more microphones and the one or more microphones may have any polar pattern suitable for the intended application including but not limited to omni-directional, directional, bi-directional, uni-directional, bi-polar, uni-polar, any variety of cardioid pattern, and shotgun, for example. MIC 170 may be configured for mono, stereo, or other. MIC 170 may be configured to be responsive (e.g., generate an electrical signal in response to sound) to any frequency range including but not limited to ultrasonic, infrasonic, from about 20 Hz to about 20 kHz, and any range within or outside of human hearing. In some applications, the audio transducer of AV system 109 may serve dual roles as both a speaker and a microphone.

Circuitry in AV system 109 may include but is not limited to a digital-to-analog converter (DAC) and algorithms for decoding and playback of media files such as MP3, FLAG, AIFF, ALAC, WAV, MPEG, QuickTime, AVI, compressed media files, uncompressed media files, and lossless media files, just to name a few, for example. A DAC may be used by AV system 109 to decode wireless data from a user device or from any of the radios in RF system 107. AV system 109 may also include an analog-to-digital converter (ADC) for converting analog signals, from MIC 170 for example, into digital signals for processing by one or more system in media device 100.

Media device 100 may be used for a variety of applications including but not limited to wirelessly communicating with other wireless devices, other media devices 100, wireless networks, and the like for playback of media (e.g., streaming content), such as audio, for example. The actual source for the media need not be located on a user's device (e.g., smart phone, MP3 player, iPod, iPhone, iPad, Android, laptop, PC, etc.). For example, media files to be played back on media device 100 may be located on the Internet, a web site, or in the Cloud, and media device 100 may access (e.g., over a WiFi network via WiFi 130) the files, process data in the files, and initiate playback of the media files. Media device 100 may access or store in its memory a playlist or favorites list and playback content listed in those lists. In some applications, media device 100 will store content (e.g., files) to be played back on the media device 100 or on another media device 100.

Media device 100 may include a housing, a chassis, an enclosure or the like, denoted in FIG. 1 as 199. The actual shape, configuration, dimensions, materials, features, design, ornamentation, aesthetics, and the like of housing 199 will be application dependent and a matter of design choice. Therefore, housing 199 need not have the rectangular form depicted in FIG. 1 or the shape, configuration etc., depicted in the Drawings of the present application. Nothing precludes housing 199 from comprising one or more structural elements, that is, the housing 199 may be comprised of several housings that form media device 100. Housing 199 may be configured to be worn, mounted, or otherwise connected to or carried by a human being. For example, housing 199 may be configured as a wristband, an earpiece, a headband, a headphone, a headset, an earphone, a hand held device, a portable device, a desktop device, just to name a few.

In other examples, housing 199 may be configured as a speaker, a subwoofer, a conference call speaker, an intercom, a media playback device, just to name a few. If configured as a speaker, then the housing 199 may be configured as a variety of speaker types including but not limited to a left channel speaker, a right channel speaker, a center channel speaker, a left rear channel speaker, a right rear channel speaker, a subwoofer, a left channel surround speaker, a right channel surround speaker, a left channel height speaker, a right channel height speaker, any speaker in a 3.1, 5.1, 7.1, 9.1 or other surround sound format including those having two or more subwoofers or having two or more center channels, for example. In other examples, housing 199 may be configured to include a display (e.g., DISP 180) for viewing video, serving as a touch screen interface for a user, providing an interface for a GUI, for example.

PROX system 113 may include one or more sensors denoted as SEN 195 that are configured to sense 197 an environment 198 external to the housing 199 of media device 100. Using SEN 195 and/or other systems in media device 100 (e.g., antenna 124, SPK 160, MIC 170, etc.), PROX system 113 senses 197 an environment 198 that is external to the media device 100 (e.g., external to housing 199). PROX system 113 may be used to sense one or more of proximity of the user or other persons to the media device 100 or other media devices 100. PROX system 113 may use a variety of sensor technologies for SEN 195 including but not limited to ultrasound, infrared (IR), passive infrared (PIR), optical, acoustic, vibration, light, ambient light sensor (ALS), IR proximity sensors, LED emitters and detectors, RGB LED's, RF, temperature, capacitive, capacitive touch, inductive, just to name a few. PROX system 113 may be configured to sense location of users or other persons, user devices, and other media devices 100, without limitation. Output signals from PROX system 113 may be used to configure media device 100 or other media devices 100, to re-configure and/or re-purpose media device 100 or other media devices 100 (e.g., change a role the media device 100 plays for the user, based on a user profile or configuration data), just to name a few. A plurality of media devices 100 in an eco-system of media devices 100 may collectively use their respective PROX system 113 and/or other systems (e.g., RF 107, de-tunable antenna 124, AV 109, etc.) to accomplish tasks including but not limited to changing configuration, re-configuring one or more media devices, implement user specified configurations and/or profiles, insertion and/or removal of one or more media devices in an eco-system, just to name a few.

In other examples, PROX 113 may include one or more proximity detection islands PSEN 520 as will be discussed in greater detail in FIGS. 5-6. PSEN 520 may be positioned at one or more locations on chassis 199 and configured to sense an approach of a user or other person towards the media device 100 or to sense motion or gestures of a user or other person by a portion of the body such as a hand for example. PSEN 520 may be used in conjunction with or in place of one or more of SEN 195, OPT 185, SPK 160, MIC 170, RF 107 and/or de-tunable 129 antenna 124 to sense proximity and/or presence in an environment surrounding the media device 100, for example. PSEN 520 may be configured to take or cause an action to occur upon detection of an event (e.g., an approach or gesture by user 201 or other) such as emitting light (e.g., via an LED), generating a sound or announcement (e.g., via SPK 160), causing a vibration (e.g., via SPK 160 or a vibration motor), display information (e.g., via DISP 180), trigger haptic feedback, for example. In some examples, PSEN 520 may be included in I/O 105 instead of PROX 113 or be shared between one or more systems of media device 100. In other examples, components, circuitry, and functionality of PSEN 520 may vary among a plurality of PSEN 520 sensors in media device 100 such that all PSEN 520 are not identical.

Simple Out-of-the-Box User Experience

Figure 2A:
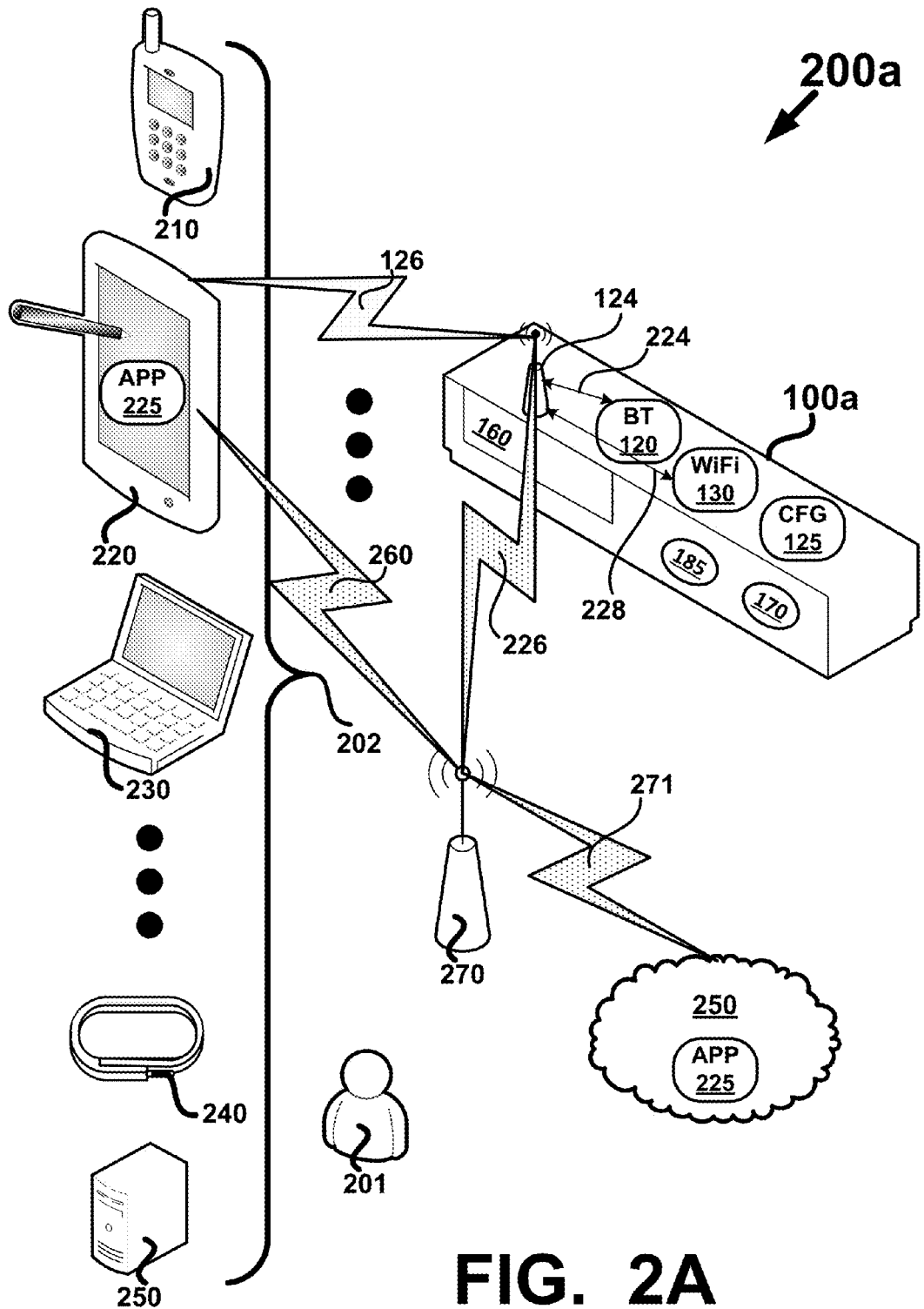
FIG. 2A depicts one example of a configuration scenario for a user device and a media device according to an embodiment of the present application.

Attention is now directed to FIG. 2A, where a scenario 200a depicts one example of a media device (e.g., media device 100 of FIG. 1 or a similarly provisioned media device) being configured for the first time by a user 201. For purposes of explanation, in FIG. 2A media device is denoted as 100a to illustrate that it is the first time the media device 100a is being configured. For example, the first configuration of media device 100a may be after it is purchased, acquired, borrowed, or otherwise by user 201, that is, the first time may be the initial out-of-the-box configuration of media device 100a when it is new. Scenario 200a depicts a desirable user experience for user 201 to achieve the objective of making the configuring of media device 100a as easy, straight forward, and fast as possible.

To that end, in FIG. 2A, scenario 200a may include media device 100a to be configured, for example, initially by user 201 using a variety of devices 202 including but not limited to a smartphone 210, a tablet 220, a laptop computer 230, a data-capable wristband or the like 240, a desktop PC or server 250, . . . etc. For purposes of simplifying explanation, the following description will focus on tablet 220, although the description may apply to any of the other devices 202 as well. Upon initial power up of media device 100a, controller 101 may command RF system 107 to electrically couple 224 transceiver BT 120 with antenna 124, and command BT 120 to begin listening 126 for a BT pairing signal from device 220. Here, user 201 as part of the initialization process may have already used a Bluetooth® menu on tablet 220 to activate the BT radio and associated software in tablet 220 to begin searching (e.g., via RF) for a BT device to pair with. Pairing may require a code (e.g., a PIN number or code) to be entered by the user 201 for the device being paired with, and the user 201 may enter a specific code or a default code such as "0000", for example.

Subsequently, after tablet 220 and media device 100a have successfully BT paired with one another, the process of configuring media device 100a to service the specific needs of user 201 may begin. In some examples, after successful BT pairing, BT 120 need not be used for wireless communication between media device 100a and the user's device (e.g., tablet 220 or other). Controller 101, after a successful BT pairing, may command RF system 107 to electrically couple 228, WiFi 130 with antenna 124 and wireless communications between tablet 220 and media device 100a (see 260, 226) may occur over a wireless network (e.g., WiFi or WiMAX) or other as denoted by wireless access point 270. Post-pairing, tablet 220 requires a non-transitory computer readable medium that includes data and/or executable code to form a configuration (CFG) 125 for media device 100a. For purposes of explanation, the non-transitory computer readable medium will be denoted as an application (APP) 225. APP 225 resides on or is otherwise accessible by tablet 220 or media device 100a. User 201 uses APP 225 (e.g., through a GUI, menu, drop down boxes, or the like) to make selections that comprise the data and/or executable code in the CFG 125.

APP 225 may be obtained by tablet 220 in a variety of ways. In one example, the media device 100a includes instructions (e.g., on its packaging or in a user manual) for a website on the Internet 250 where the APP 225 may be downloaded. Tablet 220 may use its WiFi or Cellular RF systems to communicate with wireless access point 270 (e.g., a cell tower or wireless router) to connect 271 with the website and download APP 255 which is stored on tablet 220 as APP 225. In another example, tablet 220 may scan or otherwise image a bar code or TAG operative to connect the tablet 220 with a location (e.g., on the Internet 250) where the APP 225 may be found and downloaded. Tablet 220 may have access to an applications store such as Google Play for Android devices, the Apple App Store for iOS devices, or the Windows 8 App Store for Windows 8 devices. The APP 225 may then be downloaded from the app store. In yet another example, after pairing, media device 100a may be preconfigured to either provide (e.g., over the BT 120 or WiFi 130) an address or other location that is communicated to tablet 220 and the tablet 220 uses the information to locate and download the APP 225. In another example, media device 100a may be preloaded with one or more versions of APP 225 for use in different device operating systems (OS), such as one version for Android, another for iOS, and yet another for Windows 8, etc. In that OS versions and/or APP 225 are periodically updated, media device 100a may use its wireless systems (e.g., BT 120 or WiFi 130) to determine if the preloaded versions are out of date and need to be replaced with newer versions, which the media device 100a obtains, downloads, and subsequently makes available for download to tablet 220.

Regardless of how the APP 225 is obtained, once the APP 225 is installed on any of the devices 202, the user 201 may use the APP 225 to select various options, commands, settings, etc. for CFG 125 according to the user's preferences, needs, media device ecosystem, etc., for example. After the user 201 finalizes the configuration process, CFG 125 is downloaded (e.g., using BT 120 or WiFi 130) into DS system 103 in media device 100a. Controller 101 may use the CFG 125 and/or other executable code to control operation of media device 100a. In FIG. 2A, the source for APP 225 may be obtained from a variety of locations including but not limited to: the Internet 250; a file or the like stored in the Cloud; a web site; a server farm; a FTP site; a drop box; an app store; a manufactures web site; or the like, just to name a few. APP 225 may be installed using other processes including but not limited to: dragging and dropping the appropriate file into a directory, folder, desktop or the like on tablet 220; emailing the APP 225 as an attachment, a compressed or ZIP file; cutting and pasting the App 225, just to name a few.

CFG 125 may include data such as the name and password for a wireless network (e.g., 270) so that WiFi 130 may connect with (see 226) and use the wireless network for future wireless communications, data for configuring subsequently purchased devices 100, data to access media for playback, just to name a few. By using the APP 225, user 201 may update CFG 125 as the needs of the user 201 change over time, that is, APP 225 may be used to re-configure an existing CFG 125. Furthermore, APP 225 may be configured to check for updates and to query the user 201 to accept the updates such that if an update is accepted an updated version of the APP 225 may be installed on tablet 220 or on any of the other devices 202. Although the previous discussion has focused on installing the APP 225 and CFG 125, one skilled in the art will appreciate that other data may be installed on devices 202 and/or media device 100a using the process described above. As one example, APP 225 or some other program may be used to perform software, firmware, or data updates on device 100a. DS system 103 on device 100a may include storage set aside for executable code (e.g., an operating system) and data used by controller 101 and/or the other systems depicted in FIG. 1.

Figure 2B:
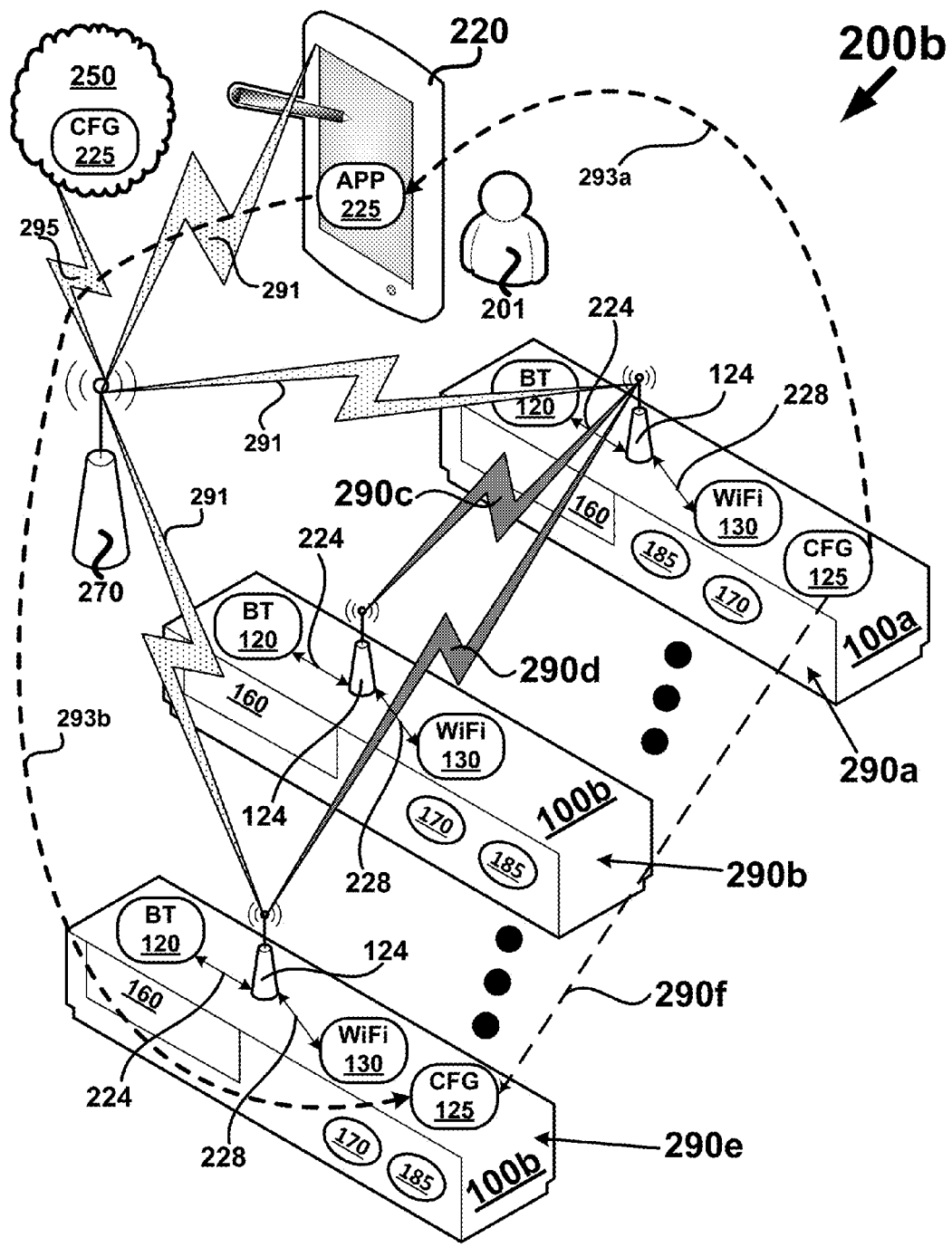
FIG. 2B depicts example scenarios for another media device being configured using a configuration from a previously configured media device according to an embodiment of the present application.

Moving on to FIG. 2B, where a several example scenarios of how a previously configured media device 100a that includes CFG 125 may be used to configure another media device 100b that is initially un-configured. In scenario 200b, media device 100a is already powered up or is turned on (e.g., by user 201) or is otherwise activated such that its RF system 107 is operational. Accordingly, at stage 290a, media device 100a is powered up and configured to detect RF signatures from other powered up media devices using its RF system 107. At stage 290b another media device denoted as 100b is introduced into RF proximity of media device 100a and is powered up so that its RF system 107 is operational and configured to detect RF signatures from other powered up media devices (e.g., signature of media device 100a). Here RF proximity broadly means within adequate signal strength range of the BT transceivers 120, WiFi transceivers 130, or any other transceivers in RF system 107, RF systems in the users devices (e.g., 202, 220), and other wireless devices such as wireless routers, WiFi networks (e.g., 270), WiMAX networks, and cellular networks, for example. Adequate signal strength range is any range that allows for reliable RF communications between wireless devices. For BT enabled devices, adequate signal strength range may be determined by the BT specification, but is subject to change as the BT specification and technology evolve. For example, adequate signal strength range for BT 120 may be approximately 10 meters (e.g., ~30 feet). For WiFi 130, adequate signal strength range may vary based on parameters such as distance from and signal strength of the wireless network, and structures that interfere with the WiFi signal. However, in most typical wireless systems adequate signal strength range is usually greater than 10 meters.

At stage 290b, media device 100b is powered up and at stage 290c its BT 120 and the BT 120 of media device 100a recognize each other. For example, each media device (100a, 100b) may be pre-configured (e.g., at the factory) to broadcast a unique RF signature or other wireless signature (e.g., acoustic) at power up and/or when it detects the unique signature of another device. The unique RF signature may include status information including but not limited to the configuration state of a media device. Each BT 120 may be configured to allow communications with and control by another media device based on the information in the unique RF signature. Accordingly, at the stage 290c, media device 100b transmits RF information that includes data that informs other listening BT 120's (e.g., BT 120 in 100a) that media device 100b is un-configured (e.g., has no CFG 125).

At stage 290d, media devices 100a and 100b negotiate the necessary protocols and/or handshakes that allow media device 100a to gain access to DS 103 of media device 100b. At stage 290e, media device 100b is ready to receive CFG 125 from media device 100a, and at stage 290f the CFG 125 from media device 100*a* is transmitted to media device 100*b* and is replicated (e.g., copied, written, etc.) in the DS 103 of media device 100*b*, such that media device 100*b* becomes a configured media device.

Data in CFG 125 may include information on wireless network 270, including but not limited to wireless network name, wireless password, MAC addresses of other media devices, media specific configuration such as speaker type (e.g., left, right, center channel), audio mute, microphone mute, etc. Some configuration data may be subservient to other data or dominant to other data. After the stage 290*f*, media device 100*a*, media device 100*b*, and user device 220 may wirelessly communicate 291 with one another over wireless network 270 using the WiFi systems of user device 220 and WiFi 130 of media devices 100*a* and 100*b*.

APP 225 may be used to input the above data into CFG 125, for example using a GUI included with the APP 225. User 201 enters data and makes menu selections (e.g., on a touch screen display) that will become part of the data for the CFG 125. APP 225 may also be used to update and/or re-configure an existing CFG 125 on a configured media device. Subsequent to the update and/or re-configuring, other configured or un-configured media devices in the user's ecosystem may be updated and/or re-configured by a previously updated and/or re-configured media device as described herein, thereby relieving the user 201 from having to perform the update and/or re-configure on several media devices. The APP 225 or a location provided by the APP 225 may be used to specify playlists, media sources, file locations, and the like. APP 225 may be installed on more than one user device 202 and changes to APP 225 on one user device may later by replicated on the APP 225 on other user devices by a synching or update process, for example. APP 225 may be stored on the internet or in the Cloud and any changes to APP 225 may be implemented in versions of the APP 225 on various user devices 202 by merely activating the APP 225 on that device and the APP 225 initiates a query process to see if any updates to the APP are available, and if so, then the APP 225 updates itself to make the version on the user device current with the latest version.

Media devices 100*a* and 100*b* having their respective WiFi 130 enabled to communicate with wireless network 270, tablet 220, or other wireless devices of user 201. FIG. 2B includes an alternate scenario 200*b* that may be used to configure a newly added media device, that is, an un-configured media device (e.g., 100*b*). For example, at stage 290*d*, media device 100*a*, which is assumed to already have its WiFi 130 configured for communications with wireless network 270, transmits over its BT 120 the necessary information for media device 100*b* to join wireless network 270. After stage 290*d*, media device 100*b*, media device 100*a*, and tablet 220 are connected 291 to wireless network 270 and may communicate wirelessly with one another via network 270. Furthermore, at stage 290*d*, media device 100*b* is still in an un-configured state. Next, at stage 290*e*, APP 225 is active on tablet 220 and wirelessly accesses the status of media devices 100*a* and 100*b*. APP 225 determines that media device 100*b* is un-configured and APP 225 acts to configure 100*b* by harvesting CFG 125 (e.g., getting a copy of) from configured media device 100*a* by wirelessly 293*a* obtaining CFG 125 from media device 100*a* and wirelessly 293*b* transmitting the harvested CFG 125 to media device 100*b*. Media device 100*b* uses its copy of CFG 125 to configure itself thereby placing it in a configured state.

After all the devices 220, 100*a*, 100*b*, are enabled for wireless communications with one another, FIG. 2B depicts yet another example scenario where after stage 290*d*, the APP 225 or any one of the media devices 100*a*, 100*b*, may access 295 the CFG 125 for media device 100*b* from an external location, such as the Internet, the cloud, etc. as denoted by 250 where a copy of CFG 125 may be located and accessed for download into media device 100*b*. APP 255, media device 100*b*, or media device 100*a*, may access the copy of CFG 125 from 250 and wirelessly install it on media device 100*b*.

In the example scenarios depicted in FIG. 2B, it should be noted that after the pairing of media device 100*a* and tablet 220 in FIG. 2A, the configuration of media device 100*b* in FIG. 2B did not require tablet 220 to use its BT features to pair with media device 100*b* to effectuate the configuration of media device 100*b*. Moreover, there was no need for the BT pairing between tablet 220 and media device 100*a* to be broken in order to effectuate the configuration of media device 100*b*. Furthermore, there is no need for table 220 and media devices 100*a* and/or 100*b* to be BT paired at all with tablet 220 in order to configure media device 100*b*. Accordingly, from the standpoint of user 201, adding a new media device to his/her ecosystem of similarly provisioned media devices does not require un-pairing with one or more already configured devices and then pairing with the new device to be added to the ecosystem. Instead, one of the already configured devices (e.g., media device 100*a* having CFG 125 installed) may negotiate with the APP 225 and/or the new device to be added to handle the configuration of the new device (e.g., device 100*b*). Similarly provisioned media devices broadly means devices including some, all, or more of the systems depicted in FIG. 1 and designed (e.g., by the same manufacture or to the same specifications and/or standards) to operate with one another in a seamless manner as media devices are added to or removed from an ecosystem.

Reference is now made to FIG. 3 where a flow diagram 300 depicts one example of configuring a first media device using an application installed on a user device as was described above in regards to FIG. 2A. At a stage 302 a Bluetooth® (BT) discovery mode is activated on a user device such as the examples 202 of user devices depicted in FIG. 2A. Typically, a GUI on the user device includes a menu for activating BT discovery mode, after which, the user device waits to pick up a BT signal of a device seeking to pair with the user's device. At a stage 304 a first media device (e.g., 100*a*) is powered up (if not already powered up). At stage 306 a BT pairing mode is activated on the first media device. Examples of activating BT pairing mode include but are not limited to pushing a button or activating a switch on the first media device that places the first media device in BT pairing mode such that its BT 120 is activated to generate a RF signal that the user's device may discover while in discovery mode. I/O system 105 of media device 100 may receive 118 as a signal the activation of BT pairing mode by actuation of the switch or button and that signal is processed by controller 101 to command RF system 107 to activate BT 120 in pairing mode. In other examples, after powering up the first media device, a display (e.g., DISP 180) may include a touch screen interface and/or GUI that guides a user to activate the BT pairing mode on the first media device.

At a stage 308 the user's device and the first media device negotiate the BT pairing process, and if BT pairing is successful, then the flow continues at stage 310. If BT pairing is not successful, then the flow repeats at the stage 206 until successful BT pairing is achieved. At stage 310 the user device is connected to a wireless network (if not already connected) such as a WiFi, WiMAX, or cellular (e.g., 3G or 4G) network. At a stage 312, the wireless network may be used to install an application (e.g., APP 225) on the user's device. The location of the APP (e.g., on the Internet or in the Cloud) may be provided with the media device or after successful BT pairing, the media device may use its BT 120 to transmit data to the user's device and that data includes a location (e.g., a URI or URL) for downloading or otherwise accessing the APP. At a stage 314, the user uses the APP to select settings for a configuration (e.g., CFG 125) for the first media device. After the user completes the configuration, at a stage 316 the user's device installs the APP on the first media device. The installation may occur in a variety of ways (see FIG. 2A) including but not limited to: using the BT capabilities of each device (e.g., 220 and 100a) to install the CFG; using the WiFi capabilities of each device to install the CFG; and having the first media device (e.g., 100a) fetch the CFG from an external source such as the Internet or Cloud using its WiFi 130; just to name a few. Optionally, at stages 318-324 a determination of whether or not the first media device is connected with a wireless network may be made at a stage 318. If the first media device is already connected with a wireless network the "YES" branch may be taken and the flow may terminate at stage 320. On the other hand, if the first media device is not connected with a wireless network the "NO" branch may be taken and the flow continues at a stage 322 where data in the CFG is used to connect WiFi 130 with a wireless network and the flow may terminate at a stage 324. The CFG may contain the information necessary for a successful connection between WiFi 130 and the wireless network, such as wireless network name and wireless network password, etc.

Now reference is made to FIG. 4A, where a flow diagram 400a depicts one example of a process for configuring an un-configured media device "B" (e.g., un-configured media device 100b at stage 290b of FIG. 2B) using a configured media device "A" (e.g., media device 100a having CFG 125 of FIG. 2B). At a stage 402 an already configured media device "A" is powered up. At a stage 404 the RF system (e.g., RF system 107 of FIG. 1) of configured media device "A" is activated. The RF system is configured to detect RF signals from other "powered up" media devices. At a stage 406, an un-configured media device "B" (e.g., un-configured media device 100b at stage 290b of FIG. 2B) is powered up. At a stage 408 the RF system of un-configured media device "B" is activated. At stage 408, the respective RF systems of the configured "A" and un-configured "B" media devices are configured to recognize each other (e.g., via their respective BT 120 transceivers or another transceiver in the RF system). At a stage 410, if the configured "A" and un-configured "B" media devices recognize each other, then a "YES" branch is taken to a stage 412 where the configured media device "A" transmits its configuration (e.g., CFG 125) to the un-configured media device "B" (e.g., see stages 290e and 290f in FIG. 2B). If the configured "A" and un-configured "B" media devices do not recognize each other, then a "NO" branch is taken and the flow may return to an earlier stage (e.g., stage 404 to retry the recognition process. Optionally, after being configured, media device "B" may be connected with a wireless network (e.g., via WiFi 130). At a stage 414 a determination is made as to whether or not media device "B" is connected to a wireless network. If already connected, then a "YES" branch is taken and the process may terminate at a stage 416. However, if not connected with a wireless network, then a "NO" branch is taken and media device "B" is connected to the wireless network at a stage 418. For example, the CFG 125 that was copied to media device "B" may include information such as wireless network name and password and WiFi 130 is configured to effectuate the connection with the wireless network based on that information. Alternatively, media device "A" may transmit the necessary information to media device "B" (e.g., using BT 120) at any stage of flow 400a, such as at the stage 408, for example. After the wireless network connection is made, the flow may terminate at a stage 420.

Attention is now directed to FIG. 4B, where a flow diagram 400b depicts another example of a process for configuring an un-configured media device "B" (e.g., un-configured media device 100b at stage 290b of FIG. 2B) using a configured media device "A" (e.g., media device 100a having CFG 125 of FIG. 2B). At a stage 422 an already configured media device "A" is powered up. At a stage 424 the RF system of configured media device "A" is activated (e.g., RF system 107 of FIG. 1). The RF system is configured to detect RF signals from other "powered up" media devices. At a stage 426, an un-configured media device "B" (e.g., un-configured media device 100b at stage 290b of FIG. 2B) is powered up. At a stage 428 the RF system of un-configured media device "b" is activated (e.g., RF system 107 of FIG. 1). At the stage 428, the respective RF systems of the configured "A" and un-configured "B" media devices are configured to recognize each other (e.g., via their respective BT 120 transceivers or another transceiver in the RF system). At a stage 430, if the configured "A" and un-configured "B" media devices recognize each other, then a "YES" branch is taken to a stage 432 where the configured media device "A" transmits information for a wireless network to the un-configured media device "B" (e.g., see stage 290b in FIG. 2B) and that information is used by the un-configured media device "B" to connect with a wireless network as was described above in regards to FIGS. 2B and 4A. If the configured "A" and un-configured "B" media devices do not recognize each other, then a "NO" branch is taken and the flow may return to an earlier stage (e.g., stage 424 to retry the recognition process. At a stage 434, the information for the wireless network is used by the un-configured media device "B" to effectuate a connection to the wireless network. At a stage 436, a user device is connected with the wireless network and an application (APP) running on the user device (e.g., APP 225 in FIG. 2B) is activated. Stage 436 may be skipped if the user device is already connected to the wireless network. The APP is aware of un-configured media device "B" presence on the wireless network and at a stage 438 detects that media device "B" is presently in an un-configured state and therefore has a status of "un-configured." Un-configured media device "B" may include registers, circuitry, data, program code, memory addresses, or the like that may be used to determine that the media device is un-configured. The un-configured status of media device "B" may be wirelessly broadcast using any of its wireless resources or other systems, such as RF 107 and/or AV 109. At a stage 440, the APP is aware of configured media device "A" presence on the wireless network and detects that media device "A" is presently in a configured state and therefore has a status of "configured." The APP harvests the configuration (CFG) (e.g., CFG 125 of FIG. 2B) from configured media device "A", and at a stage 442 copies (e.g., via a wireless transmission over the wireless network) the CFG to the un-configured media device "B." At a stage 444, previously un-configured media device "B" becomes a configured media device "B" by virtue of having CFG resident in its system (e.g., CFG 125 in DS system 103 in FIG. 1). After media device "B" has been configured, the flow may terminate at a stage 446. In other examples, the APP may obtain the CFG from a location other than the configured media device "A", such as the Internet or the Cloud as depicted in FIG. 2B. Therefore, at the stage 440, the APP may download the CFG from a web site, from Cloud storage, or other locations on the Internet or an intranet for example.

In the examples depicted in FIGS. 2A-4B, after one of the media devices is configured, additional media devices that are added by the user or are encountered by the user may be configured without the user (e.g., user 201) having to break a BT pairing with one media device and then establishing another BT pairing with a media device the user is adding to his/her media device ecosystem. Existing media devices that are configured (e.g., have CFG 125) may be used to configure a new media device using the wireless systems (e.g., acoustic, optical, RF) of the media devices in the ecosystem. If multiple configured media devices are present in the ecosystem when the user adds a new un-configured media device, configured media devices may be configured to arbitrate among themselves as to which of the configured devices will act to configured the newly added un-configured media device. For example, the existing media device that was configured last in time (e.g., by a date stamp on its CFG 125) may be the one selected to configure the newly added un-configured media device. Alternatively, the existing media device that was configured first in time (e.g., by a date stamp on its CFG 125) may be the one selected to configure the newly added un-configured media device. The APP 225 on the user device 220 or other, may be configured to make the configuration process as seamless as possible and may only prompt the user 201 that the APP 225 has detected an un-configured media device and query the user 201 as to whether or not the user 201 wants the APP 225 to configure the un-configured media device (e.g., media device 100b). If the user replies "YES", then the APP 225 may handle the configuration process working wirelessly with the configured and un-configured media devices. If the user 201 replies "NO", then the APP 225 may postpone the configuration for a later time when the user 201 is prepared to consummate the configuration of the un-configured media device. In other examples, the user 201 may want configuration of un-configured media devices to be automatic upon detection of the un-configured media device(s). Here the APP and/or configured media devices would automatically act to configure the un-configured media device(s).

APP 225 may be configured (e.g., by the user 201) to automatically configure any newly detected un-configured media devices that are added to the user's 201 ecosystem and the APP 225 may merely inform the user 201 that it is configuring the un-configured media devices and inform the user 201 when configuration is completed, for example. Moreover, in other examples, once a user 201 configures a media device using the APP 225, subsequently added un-configured media devices may be automatically configured by an existing configured media device by each media device recognizing other media devices (e.g., via wireless systems), determining the status (e.g., configured or un-configured) of each media device, and then using the wireless systems (e.g., RF 107, AV 109, I/O 105, OPT 185, PROX 113) of a configured media device to configure the un-configured media device without having to resort to the APP 225 on the user's device 220 to intervene in the configuration process. That is, the configured media devices and the un-configured media devices arbitrate and effectuate the configuring of un-configured media devices without the aid of APP 225 or user device 220. In this scenario, the controller 101 and/or CFG 125 may include instructions for configuring media devices in an ecosystem using one or more systems in the media devices themselves.

In at least some examples, the structures and/or functions of any of the above-described features may be implemented in software, hardware, firmware, circuitry, or in any combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, scripts, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" may refer, for example, to an algorithm or a portion thereof, and/or logic implemented in either hardware circuitry or software, or a combination thereof. These may be varied and are not limited to the examples or descriptions provided. Software, firmware, algorithms, executable computer readable code, program instructions for execution on a computer, or the like may be embodied in a non-transitory computer readable medium.

Media Device with Proximity Detection

Figure 5:
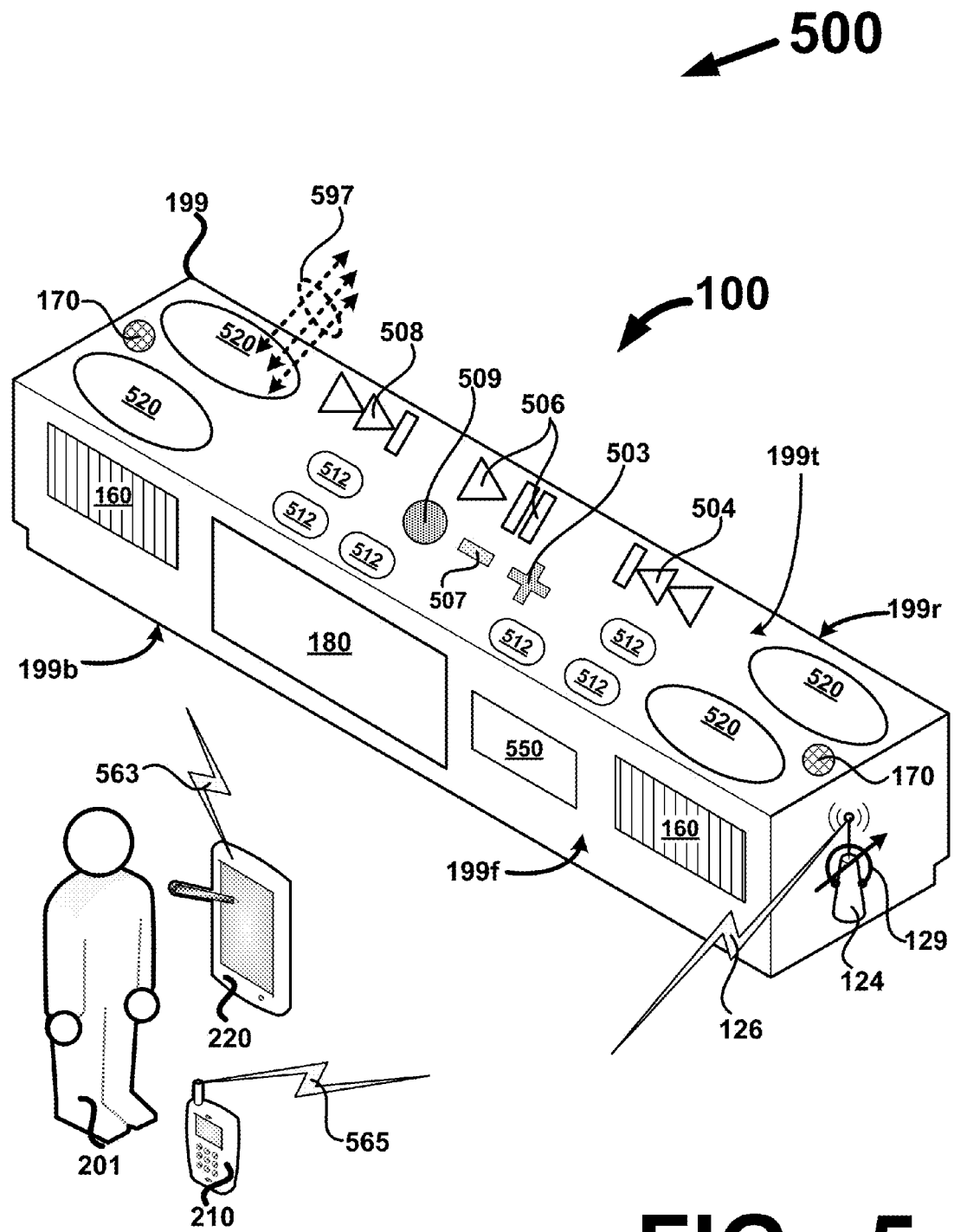
FIG. 5 depicts a profile view of one example of a media device including control elements and proximity detection islands according to embodiments of the present application.

Attention is now directed to FIG. 5 where a profile view depicts one example 500 of media device 100 that may include on a top surface 199s of chassis 199, a plurality of control elements 503-512 and one or more proximity detection islands (four are depicted) denoted as 520. Media device 100 may include one or more speakers 160, one or more microphones 170, a display 180, a section 550 for other functions such as SEN 195, VID 109, or other, and antenna 124 which may be tunable 129. Each proximity detection island 520 may be configured to detect 597 proximity of one or more persons, such as user 201 as will be described in greater detail below. The layout and position of the elements on chassis 199 of media device 100 are examples only and actual layout and position of any elements will be application specific and/or a matter of design choice, including ergonomic and esthetic considerations. As will be described in greater detail below, detection of presence of user 201 may occur with or without the presence of one or more user devices 202, such as user devices 210 and 220 depicted in FIG. 5. Circuitry and/or software associated with operation of proximity detection islands 520 may work in conjunction with other systems in media device 100 to detect presence of one or more user devices 202, such as RF system 107 detecting RF signals 563 and/or 565 (e.g., via antenna 124) from user devices 210 and 220 or MIC 170 detecting sound, for example. Detection of presence may be signaled by media device 100 in a variety of ways including but not limited to light (e.g., from 520 and/or 503-512), sound (e.g., from SPK 160), vibration (e.g., from SPK 160 or other), haptic feedback, tactile feedback, display of information (e.g., DISP 180), RF transmission (e.g., 126), just to name a few. SPK 160 and DISP 180 may be positioned on a front surface 199f of chassis 199. A bottom surface 199b of chassis 199 may be configured to rest on a surface such as a table, desk, cabinet, or the like. Other elements of media device 100 may be positioned on a rear surface 199r of chassis 199.

Non-limiting examples of control elements 503-512 include a plurality of controls 512 (e.g., buttons, switches and/or touch surfaces) that may have functions that are fixed or change based on different scenarios as will be described below, controls 503 and 507 for volume up and volume down, control 509 for muting volume or BT pairing, control 506 for initiating or pausing playback of content, control 504 for fast reversing playback or skipping backward one track, and control 508 for fast forwarding playback or skipping forward one track. Some are all of the control elements 504-512 may serve multiple roles based on changing scenarios. For example, for playback of video content or for information displayed on display 180 (e.g., a touch screen), controls 503 and 507 may be used to increase "+" and decrease "−" brightness of display 180. Control 509 may be used to transfer or pick up a phone call or other content on a user device 202, for example. Proximity detection islands 520 and/or control elements 503-512 may be backlit (e.g., using LED's or the like) for night or low-light visibility.

Figure 6:
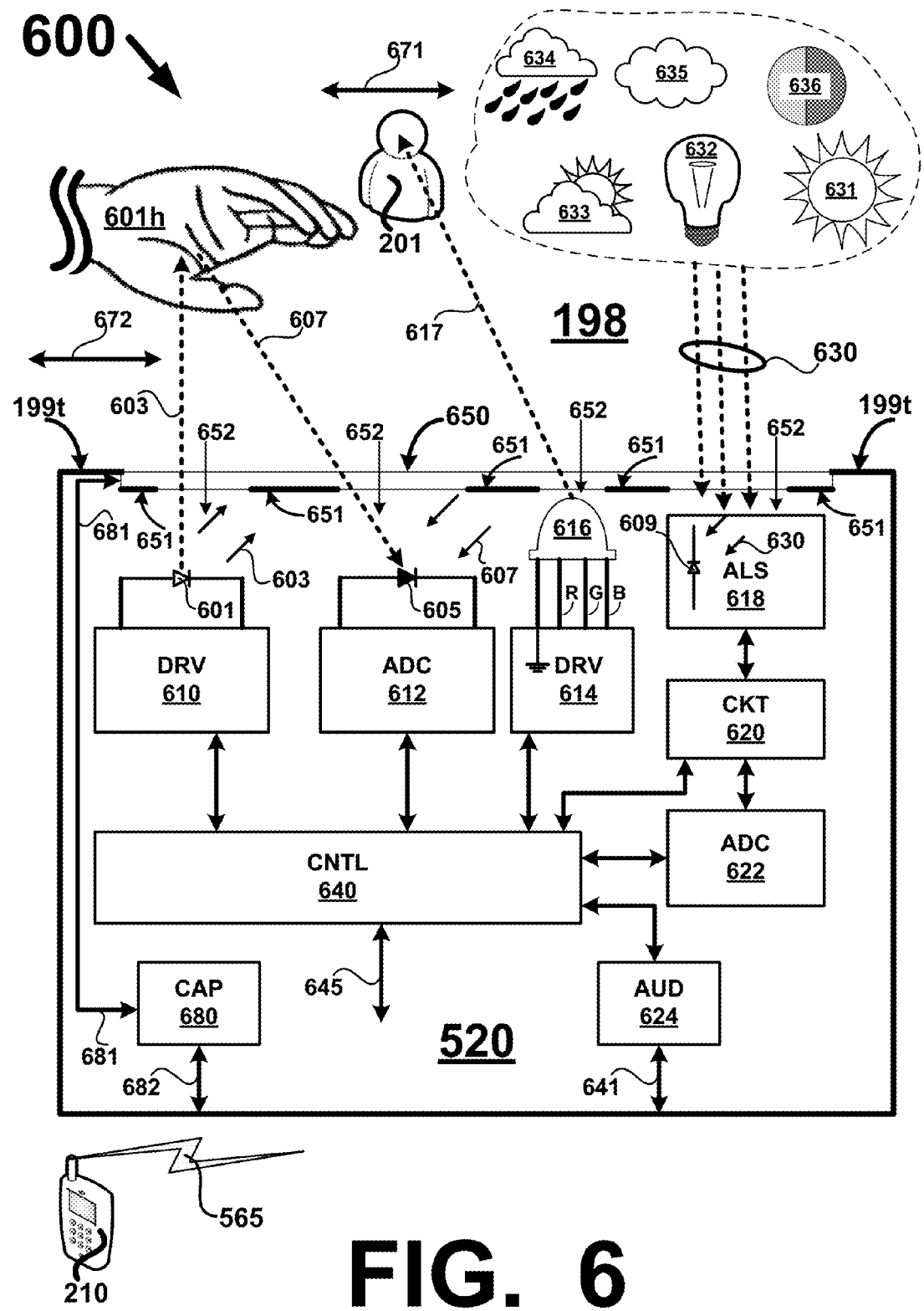
FIG. 6 depicts a block diagram of one example of a proximity detection island according to embodiments of the present application.

Moving on to FIG. 6, a block diagram 600 depicts one example of a proximity detection island 520. Proximity detection island 520 may be implemented using a variety of technologies and circuit topologies and the example depicted in FIG. 6 is just one such non-limiting example and the present application is not limited to the arrangement of elements depicted in FIG. 6. One or more proximity detection islands 520 may be positioned on, connected with, carried by or otherwise mounted on media device 100. For example, proximity detection island 520 may be mounted on a top surface 199t of chassis 199. A structure 650 made from an optically transmissive material such as glass, plastic, a film, an optically transparent or translucent material, or the like. Structure 650 may be made from a material that allows light 603, 607, 617, and 630 to pass through it in both directions, that is, bi-directionally. Structure 650 may include apertures 652 defined by regions 651 (e.g., an opaque or optically reflective/absorptive material) used for providing optical access (e.g., via apertures 652) to an environment ENV 198 external to the media device 100 for components of the proximity detection island 520. Structure 650 may be configured to mount flush with top surface 199t, for example. In some examples, structure 650 may not include regions 651.

Proximity detection island 520 may include at least one LED 601 (e.g., an infrared LED—IR LED) electrically coupled with driver circuitry 610 and configured to emit IR radiation 603, at least one IR optical detector 605 (e.g., a PIN diode) electrically coupled with an analog-to-digital converter ADC 612 and configured to generate a signal in response to IR radiation 607 incident on detector 605, and at least one indicator light 616 electrically coupled with driver circuitry 614 and configured to generate colored light 617. As depicted, indicator light 616 comprises a RGB LED configured to emit light 617 in a gambit of colors indicative of status as will be described below. Here, RGB LED 616 may include four terminals, one of which coupled with circuit ground, a red "R" terminal, a green "G" terminal, and a blue "B" terminal, all of which are electrically connected with appropriate circuitry in driver 614 and with die within RGB LED 616 to effectuate generation of various colors of light in response to signals from driver 614. For example, RGB LED 616 may include a semiconductor die for LED's that generate red, green, and blue light that are electrically coupled with ground and the R, G, and B terminals, respectively. One skilled in the art will appreciate that element 616 may be replaced by discrete LED's (e.g., separate red, green, white, and blue LED's) or a single non-RGB LED or other light emitting device may be used for 616. The various colors may be associated with different users who approach and are detected in proximity of the media device and/or different user devices that are detected by the media device. Therefore, if there are four users and/or user devices detected, then: the color blue may be associated with user #1; yellow with user #2; green with user #3; and red with user #4. Some users and or user devices may be indicated using alternating colors of light such as switching/flashing between red and green, blue and yellow, blue and green, etc. In other examples other types of LED's may be combined with RGB LED 616, such as a white LED, for example, to increase the number of color combinations possible.

Optionally, proximity detection island 520 may include at least one light sensor for sensing ambient light conditions in the ENV 198, such as ambient light sensor ALS 618. ALS 618 may be electrically coupled with circuitry CKT 620 configured to process signals from ALS 618, such as optical sensor 609 (e.g., a PIN diode) in response to ambient light 630 incident on optical sensor 609. Signals from CKT 620 may be further processed by ADC 622. The various drivers, circuitry, and ADC's of proximity detection island 520 may be electrically coupled with a controller (e.g., a μC, a μP, an ASIC, or controller 101 of FIG. 1) that is electrically coupled with a bus 645 (e.g., bus 110 of FIG. 1) that communicates signals between proximity detection island 520 and other systems of media device 100. Proximity detection island 520 may include auditory system AUD 624 configured to generate sound or produce vibrations in response to presence detection or other signals. AUD 624 may be mechanically coupled 641 with chassis 199 to cause chassis 199 to vibrate or make sound in response to presence detection or other signals. In some examples AUD 624 may use SPK 160 to generate sound or vibration. In other examples AUD 624 may use a vibration motor, such as the type used in smartphones to cause vibration when a phone call or notification is received. In yet another example, AUD 624 may use a piezoelectric film that deforms in response to an AC or DC signal applied to the film, the deformation generating sound and/or vibration. In yet other examples, AUD 624 may be connected with or mechanically coupled with one or more of the control elements and/or one or more of the proximity detection islands 520 depicted in FIG. 5 to provide haptic and/or tactile feedback. Upon detecting and acknowledging an approach by a user and/or user device, media may generate sound (e.g., from SPK 160) in a rich variety of tones and volume levels to convey information and/or media device status to the user. For example, a tone and volume level may be used to indicate the power status of the media device 100, such as available charge in BAT 135 of power system 111. The volume of the tone may be louder when BAT 135 is fully charged and lower for reduced levels of charge in BAT 135. Other tones and volume levels may be used to indicate the media device 100 is ready to receive input from the user or user device, the media device 100 is in wireless communications with a WiFi router or network, cellular service, broadband service, ad hoc WiFi network, other BT enabled devices, for example.

Proximity detection island 520 may be configured to detect presence of a user 201 (or other person) that enters 671 an environment 198 the media device 100 is positioned in. Here, entry 671 by user 201 may include a hand 601h or other portion of the user 201 body passing within optical detection range of proximity detection island 520, such as hand 601h passing over 672 the proximity detection island 520, for example. IR radiation 603 from IRLED 601 exiting through portal 652 reflects off hand 601h and the reflected IR radiation 607 enters portal 652 and is incident on IR detector 605 causing a signal to be generated by ADC 612, the signal being indicative of presence being detected. RGB LED 616 may be used to generate one or more colors of light that indicate to user 201 that the user's presence has been detected and the media device is ready to take some action based on that detection. The action taken will be application specific and may depend on actions the user 201 programmed into CFG 125 using APP 225, for example. The action taken and/or the colors emitted by RGB LED 616 may depend on the presence and/or detection of a user device 210 in conjunction with or instead of detection of presence of user 201 (e.g., RF 565 from device 210 by RF system 107).

As described above, proximity detection island 520 may optionally include ambient light sensor ALS 618 configured to detect ambient light 630 present in ENV 198 such as a variety of ambient light sources including but not limited to natural light sources such as sunny ambient 631, partially cloudy ambient 633, inclement weather ambient 634, cloudy ambient 635, and night ambient 636, and artificial light ambient 632 (e.g., electronic light sources). ALS 618 may work in conjunction with IRLED 610 and/or IR detector 605 to compensate for or reduce errors in presence detection that are impacted by ambient light 630, such as IR background noise caused by IR radiation from 632 or 631, for example. IR background noise may reduce a signal-to-noise ratio of IR detector 605 and cause false presence detection signals to be generated by ADC 612.

ALS 618 may be used to detect low ambient light 630 condition such as moonlight from 636 or a darkened room (e.g., light 632 is off), and generate a signal consistent with the low ambient light 630 condition that is used to control operation of proximity detection island 520 and/or other systems in media device 100. As one example, if user approaches 671 proximity detection island 520 in low light or no light conditions as signaled by ALS 618, RGB LED 616 may emit light 617 at a reduced intensity to prevent the user 201 from being startled or blinded by the light 617. Further, under low light or no light conditions AUD 624 may be reduced in volume or vibration magnitude or may be muted. Additionally, audible notifications (e.g., speech or music from SPK 160) from media device 100 may be reduced in volume or muted under low light or no light conditions (see FIG. 9).

Structure 650 may be electrically coupled 681 with capacitive touch circuitry 680 such that structure 650 is operative as a capacitive touch switch that generates a signal when a user (e.g., hand 601h) touches a portion of structure 650. Capacitive touch circuitry 680 may communicate 682 a signal to other systems in media device 100 (e.g., I/O 105) that process the signal to determine that the structure 650 has been touched and initiate an action based on the signal. A user's touch of structure 650 may trigger driver 614 to activate RGB LED 616 to emit light 617 to acknowledge the touch has been received and processed by media device 100.

Figure 7:
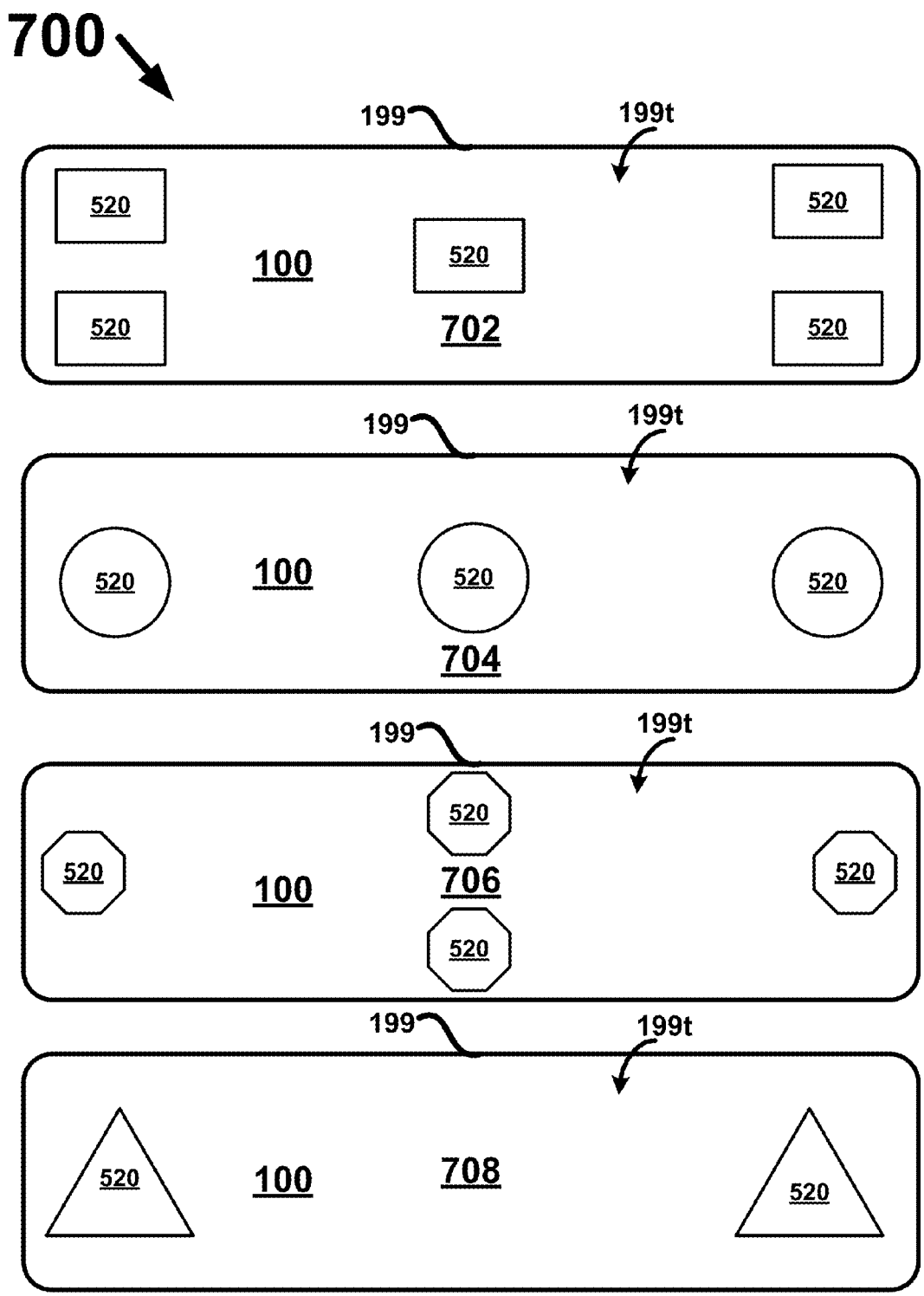
FIG. 7 depicts a top plan view of different examples of proximity detection island configurations according to embodiments of the present application.

Reference is now made to FIG. 7, where top plan views of different examples of proximity detection island 520 configurations are depicted. Although the various example configurations and shapes are depicted as positioned on top surface 199t of chassis 199, the present application is not so limited and proximity detection islands 520 may be positioned on other surfaces/portions of media device 100 and may have shapes different than that depicted. Furthermore, media device 100 may include more or fewer proximity detection islands 520 than depicted in FIG. 7 and the proximity detection islands 520 need not be symmetrically positioned relative to one another. Actual shapes of the proximity detection islands 520 may be application specific and may be based on esthetic considerations. Configuration 702 depicts five rectangular shaped proximity detection islands 520 positioned on top surface 199t with four positioned proximate to four corners of the top surface 199t and one proximately centered on top surface 199t. Configuration 704 depicts three circle shaped proximity detection islands 520 proximately positioned at the left, right, and center of top surface 199t. Configuration 706 depicts four hexagon shaped proximity detection islands 520 proximately positioned at the left, right, and two at the center of top surface 199t. Finally, configuration 708 depicts two triangle shaped proximity detection islands 520 proximately positioned at the left, right of top surface 199t. In some examples there may be a single proximity detection island 520. Proximity detection islands 520 may be configured to operate independently of one another, or in cooperation with one another.

Figure 8A:
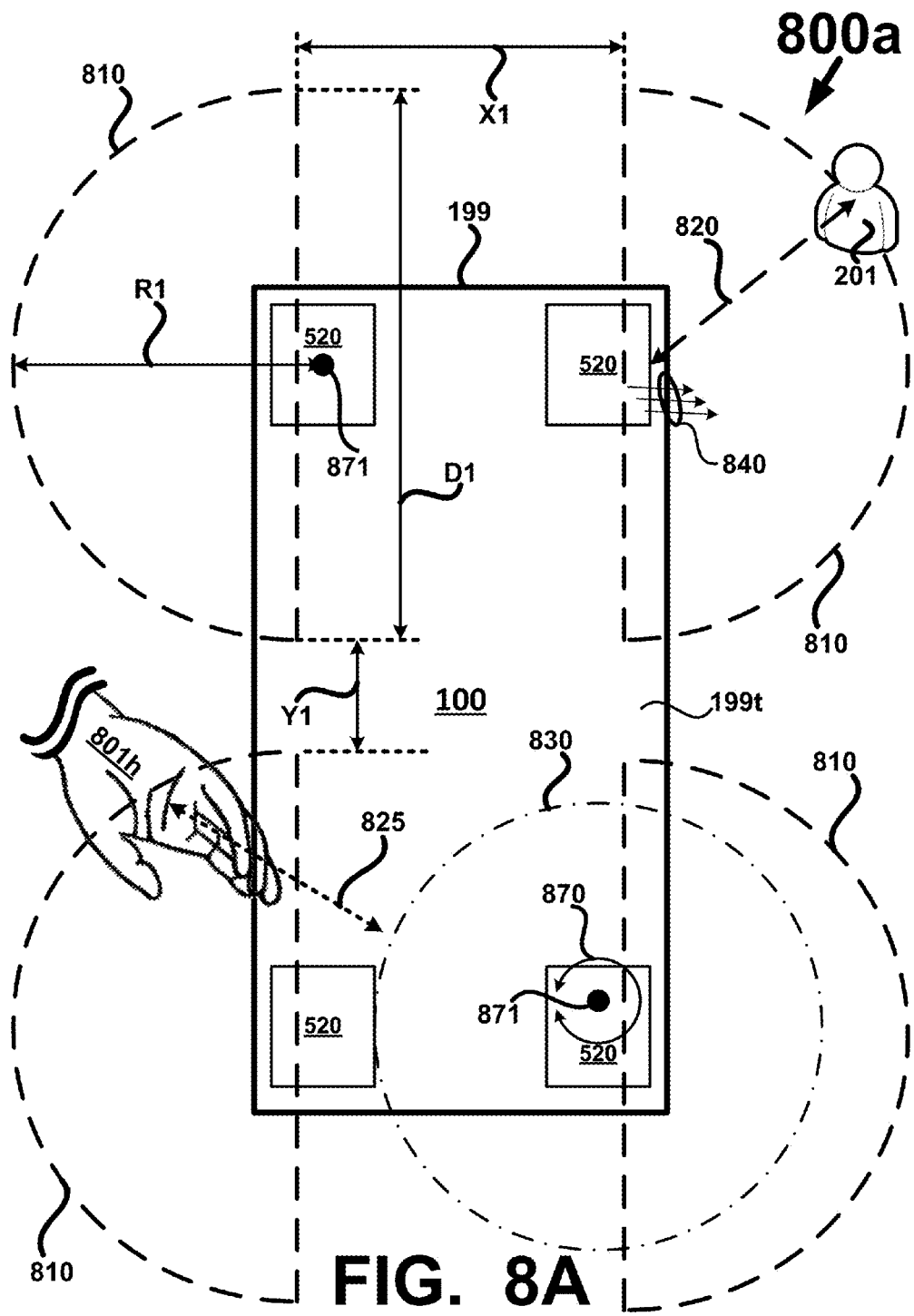
FIG. 8A is a top plan view depicting an example of proximity detection island coverage according to embodiments of the present application.

Moving to FIG. 8A, a top plan view of proximity detection island 520 coverage is depicted. Each proximity detection island 520 may be designed to have a coverage pattern configured to detect presence of user 201 when the user 201 or portion of the user body (e.g., hand 801h) enters the coverage pattern. Here, the coverage pattern may be semicircular 810 or circular 830, for example. Semicircular 810 coverage pattern may extend outward a distance R1 (e.g., approximately 1.5 meters) from proximity detection island 520 and may span a distance D1 about a center 871 of proximity detection island 520. Semicircular 810 coverage patterns of the four proximity detection islands 520 may not overlap one another such that there may be a coverage gap X1 and Y1 between the adjacent coverage patterns 810. Entry 825 of hand 801h or entry 820 of user 201 may cause one or more of the proximity detection islands 520 to indicate 840 that a presence has been detected, by emitting a color of light from RGB LED 616, for example. In other examples, the coverage pattern may be circular 830 and cover a 360 degree radius 870 about a center point 871 of proximity detection island 520. Circular 830 coverage pattern 830 may or may not overlap the circular 830 pattern of the other proximity detection islands 520.

Figure 8B:
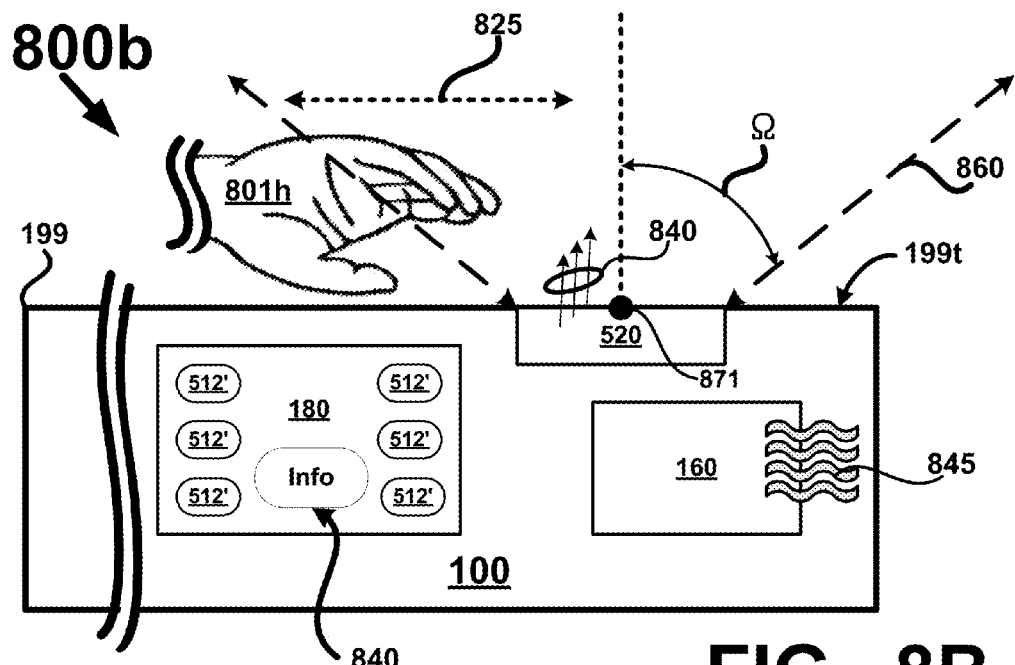
FIG. 8B is a front side view depicting an example of proximity detection island coverage according to embodiments of the present application.
Figure 8C:
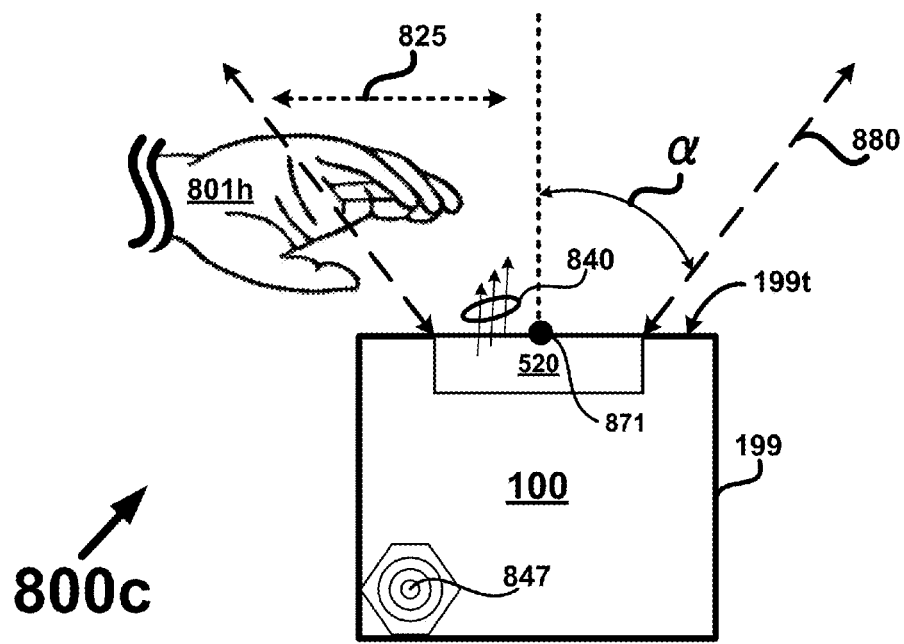
FIG. 8C is a side view depicting an example of proximity detection island coverage according to embodiments of the present application.

FIG. 8B depicts a front view 800b of media device 100 and a coverage pattern 860 that has an angular profile Ω about center point 871. Hand 801h entering 825 into the coverage pattern 860 is detected by proximity detection island 520 and detection of hand 810 triggers light 840 being generate by RGB LED 616 of proximity detection island 520. Detection of hand 810 may also cause information "Info" to be displayed on DISP 180 and/or sound 845 to be generated by SPK 160. In FIG. 8C, a side view 800c of media device 100 is depicted with proximity detection island 520 having angular profile a about center point 871 for a coverage pattern 880. Hand 801h entering 825 into the coverage pattern 880 is detected by proximity detection island 520 and detection of hand 810 triggers light 840 being generated by RGB LED 616 of proximity detection island 520 and AUD 624 generating vibration 847.

Figure 9:
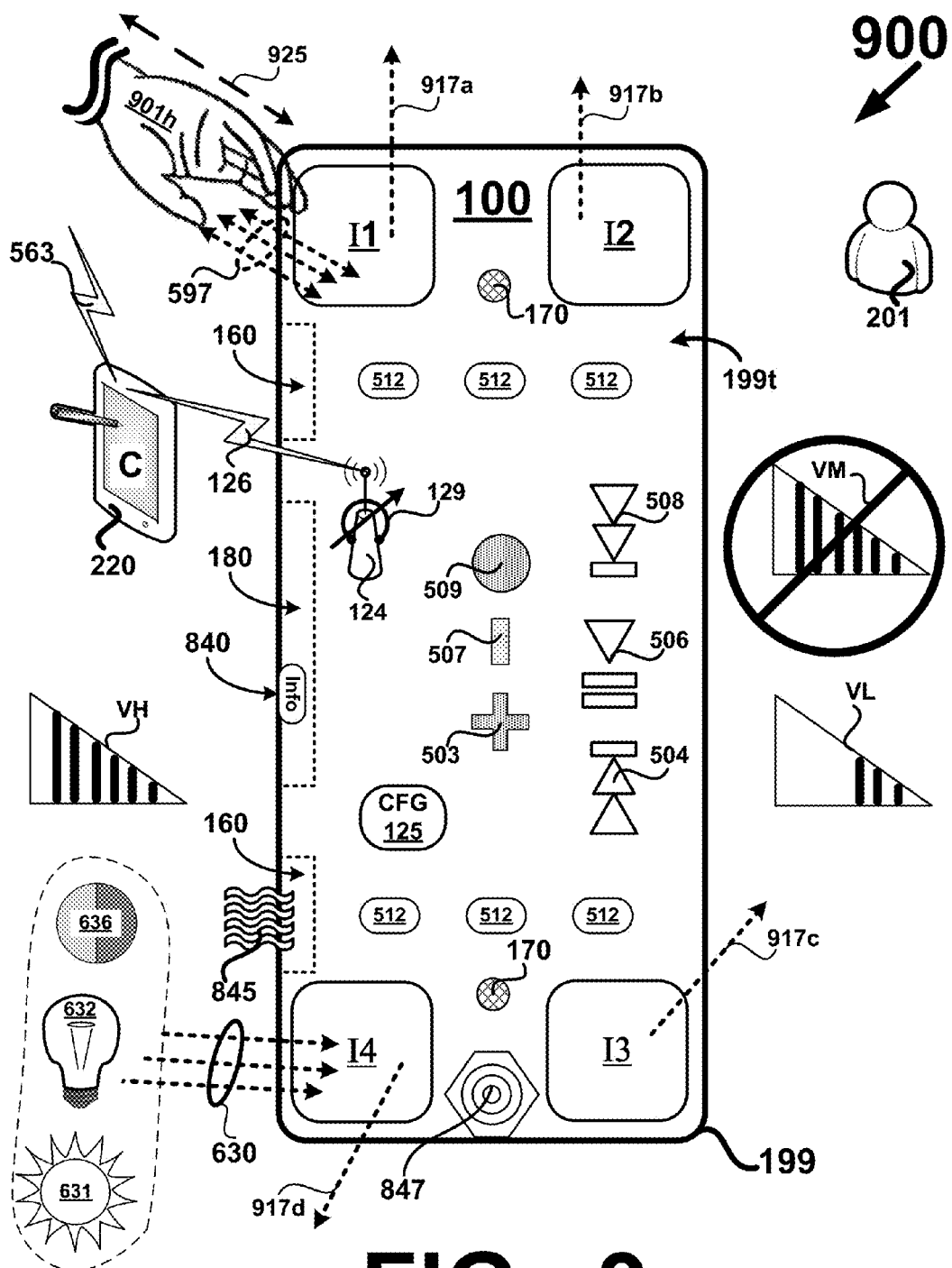
FIG. 9 is a top plan view of a media device including proximity detection islands configured to detect presence according to embodiments of the present application.

Attention is now directed to FIG. 9, where a top plan view 900 of media device 100 depicts four proximity detection islands 520 denoted as I1, I2, I3, and I4. Furthermore, control elements 503-512 are depicted on top surface 199t. In the example depicted, hand 901h enters into proximity detection range of at least proximity detection island I1 and triggers generation of light (917a-d) from one or more of the islands (I1, I2, I3, I4) such as light 617 from RGB LED 616 of FIG. 6, for example. Presence detection by proximity detection island I1 may cause a variety of response from media device 100 including but not limited to signaling that presence has been detected using light (917*a-d*), generating sound 845 from SPK 160, vibration 847, displaying info 840 on DISP 180, capturing and acting on content C from user device 220, establishing wireless communications 126 with user device 220 or other wireless device (e.g., a wireless router), just to name a few. Presence detection by proximity detection island I1 may cause media device 100 to notify user 201 that his/her presence has been detected and the media device is ready to receive input or some other action from user 201. Input and/or action from user 201 may comprise user 201 actuating one of the control elements 503-512, touching or selecting an icon displayed on DISP 180, issuing a verbal command or speech detected by MIC 170.

As one example, upon detecting presence of user 201, media device 100 may emit light 917*c* from proximity detection island 13. If the user device 220 is present and also detected by media device 100 (e.g., via RF signals 126 and/or 563), then the media device 100 may indicate that presence of the user device 220 is detected and may take one or more actions based on detecting presence of the user device 220. If user device 220 is one that is recognized by media device 100, then light 917*c* from proximity detection island 13 may be emitted with a specific color assigned to the user device 220, such as green for example. Recognition of user device 220 may occur due to the user device 220 having been previously BT paired with media device 100, user device 220 having a wireless identifier such as a MAC address or SSID stored in or pre-registered in media device 100 or in a wireless network (e.g., a wireless router) the media device 100 and user device 220 are in wireless communications with, for example. DISP 180 may display info 840 consistent with recognition of user device 220 and may display via a GUI or the like, icons or menu selections for the user 201 to choose from, such as an icon to offer the user 201 a choice to transfer content C from user device 220 to the media device 100, to switch from BT wireless communication to WiFi wireless communication, for example. As one example, if content C comprises a telephone conversation, the media device 100 through instructions or the like in CFG 125 may automatically transfer the phone conversation from user device 220 to the media device 100 such that MIC 170 and SPK 160 are enabled so that media device 100 serves as a speaker phone or conference call phone and media device 100 handles the content C of the phone call. If the transfer of content C is not automatic, CFG 125 or other programming of media device 100 may operate to offer the user 201 the option of transferring the content C by displaying the offer on DISP 180 or via one of the control elements 503-512. For example, control element 509 may blink (e.g., via backlight) to indicate to user 201 that actuating control element 509 will cause content C to be transferred from user device 220 to media device 100.

In some examples, control elements 503-512 may correspond to menu selections displayed on DISP 180 and/or a display on the user device 220. For example, control elements 512 may correspond to six icons on DISP 180 (see 512' in FIG. 8) and user 201 may actuate one of the control elements 512 to initiate whatever action is associated with the corresponding icon on DISP 180, such as selecting a playlist for media to be played back on media device 100. Or the user 201 may select one of the icons 512' on DISP 180 to effectuate the action.

As one example, if content C comprises an alarm, task, or calendar event the user 201 has set in the user device 220, that content C may be automatically transferred or transferred by user action using DISP 180 or control elements 503-512, to media device 100. Therefore, a wake up alarm set on user device 220 may actually be implemented on the media device 100 after the transfer, even if the user device 220 is powered down at the time the alarm is set to go off. When the user device is powered up, any alarm, task, or calendar event that has not been processed by the media device 100 may be transferred back to the user device 220 or updated on the user device so that still pending alarm, task, or calendar events may be processed by the user device when it is not in proximity of the media device 100 (e.g., when user 201 leaves for a business trip). CFG 125 and APP 225 as described above may be used to implement and control content C handling between media device 100 and user devices.

Some or all of the control elements 503-512 may be implemented as capacitive touch switches. Furthermore, some or all of the control elements 503-512 may be backlit (e.g., using LED's, light pipes, etc.). For example, control elements 512 may be implemented as capacitive touch switches and they may optionally be backlit. In some examples, after presence is detected by one or more of the proximity detection islands (I1, I2, I3, I4), one or more of the control elements 503-512 may be backlit or have its back light blink or otherwise indicate to user 201 that some action is to be taken by the user 201, such as actuating (e.g., touching) one or more of the backlit and/or blinking control elements 512. In some examples, proximity detection islands (I1, I2, I3, I4) may be configured to serve as capacitive touch switches or another type of switch, such that pressing, touching, or otherwise actuating one or more of the proximity detection islands (I1, I2, I3, I4) results in some action being taken by media device 100.

In FIG. 9, actions taken by media device 100 subsequent to detecting presence via proximity detection islands (I1, I2, I3, I4) and/or other systems such as RF 107, SEN 195, MIC 170, may be determined in part on ambient light conditions as sensed by ALS 618 in proximity detection islands (I1, I2, I3, I4). As one example, if ambient light 630 is bright (e.g., 631 or 632), then brightness of DISP 180 may be increased, light 917*a-d* from islands may be increased, and volume from SPK 160 may be nominal or increased because the ambient light 630 conditions are consistent with waking hours were light intensity and volume may not be a distraction to user 201. On the other hand, if ambient light 630 is dim or dark (e.g., 636), then brightness of DISP 180 may be decreased, light 917*a-d* from islands may be decreased, and volume from SPK 160 may be reduced or muted because the ambient light 630 conditions are consistent with non-waking hours were light intensity and volume may be a distraction to or startle user 201. Other media device 100 functions such as volume level, for example, may be determined based on ambient light 630 conditions (e.g., as detected by ALS 618 of island I4). As one example, under bright ambient light 630 conditions, volume VH of SPK 160 may be higher (e.g., more bars); whereas, under low ambient light 630 conditions, volume VL of SPK 160 may be lower (e.g., fewer bars) or may be muted entirely VM. Conditions other than ambient light 630 may cause media device 100 to control volume as depicted in FIG. 9.

Figure 10:
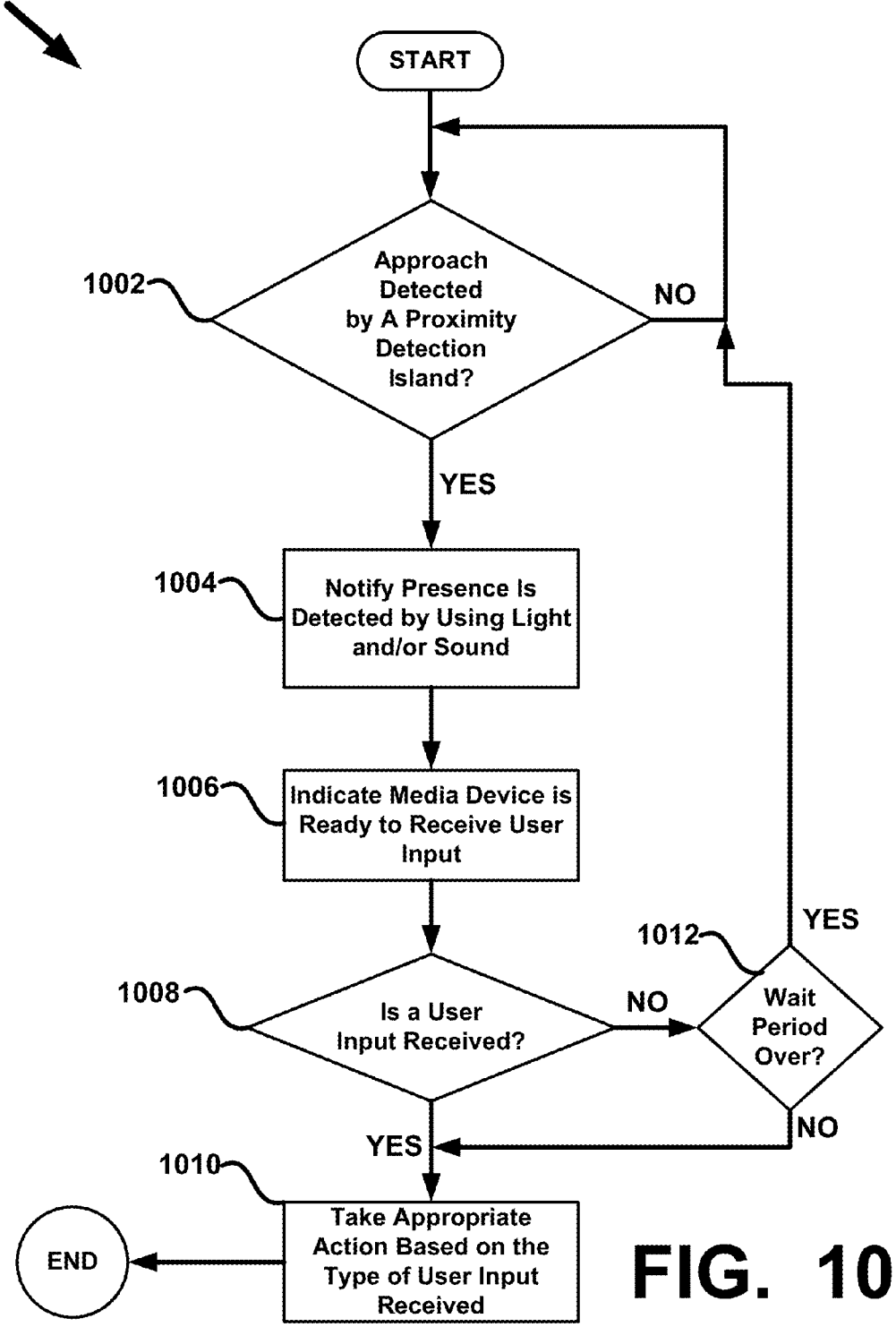
FIG. 10 depicts one example of a flow for presence detection, notification, and media device readiness according to embodiments of the present application.

FIG. 10 depicts one example of a flow 1000 for presence detection, notification, and media device readiness. At a stage 1002 a query as to whether or not an approach is detected by one or more of the proximity detection islands (e.g., I1, I2, I3, I4) is made. Here, the query may be by controller CNTL 640 or controller 101, for example. If one or more of the proximity detection islands have detected presence, then a YES branch is taken. If no presence is detected by one or more of the proximity detection islands, then a NO branch is taken and the flow 1000 may return to the stage 1002 to wait for one or more of the proximity detection islands to detect a presence. The YES branch takes flow 1000 to a stage 1004 where a notification is executed by the media device 100 using light, sound, or vibration to notify a user that presence has been detected, for example, using one or more colors of light (e.g., from RGB LED's 616) and/or an auditory cue (e.g., from SPK 160, vibration from 847, or from a passive radiator used as one of the SPK 160). At a stage 1006, the media device 100 indicates that it is ready to receive input from a user and/or user device (e.g., user 201 or a user device 220 via RF 107). At a stage 1008 a query is made as to whether or not an input is received from a user. If an input is received from the user and/or user device, then a YES branch is taken to a stage 1010 where the media device 100 takes an appropriate action based on the type of user input received and the flow may terminate after the stage 1010. Appropriate actions taken by media device 100 will be application dependent and may be determined in whole or in part by APP 225, CFG 125, executable program code, hardware, etc. Inputs from the user includes but are not limited to actuation of one or more of the control elements 503-512, touching an icon or other area of DISP 180, issuing a spoken command or speech detected by MIC 170, taking an action on user device 220 that is wirelessly communicated to media device 100, just to name a few. If no input is received from the user and/or user device, then a NO branch is taken and the flow 1000 may continue at a stage 1012 where flow 1000 may enter into a wait period of predetermined time (e.g., of approximately 15 seconds or one minute, etc.). If a user input is received before the wait period is over, then a NO branch may be taken to the stage 1010. If the wait period is over, then a YES branch may be taken and flow 1000 may resume at the stage 1002.

Figure 11:
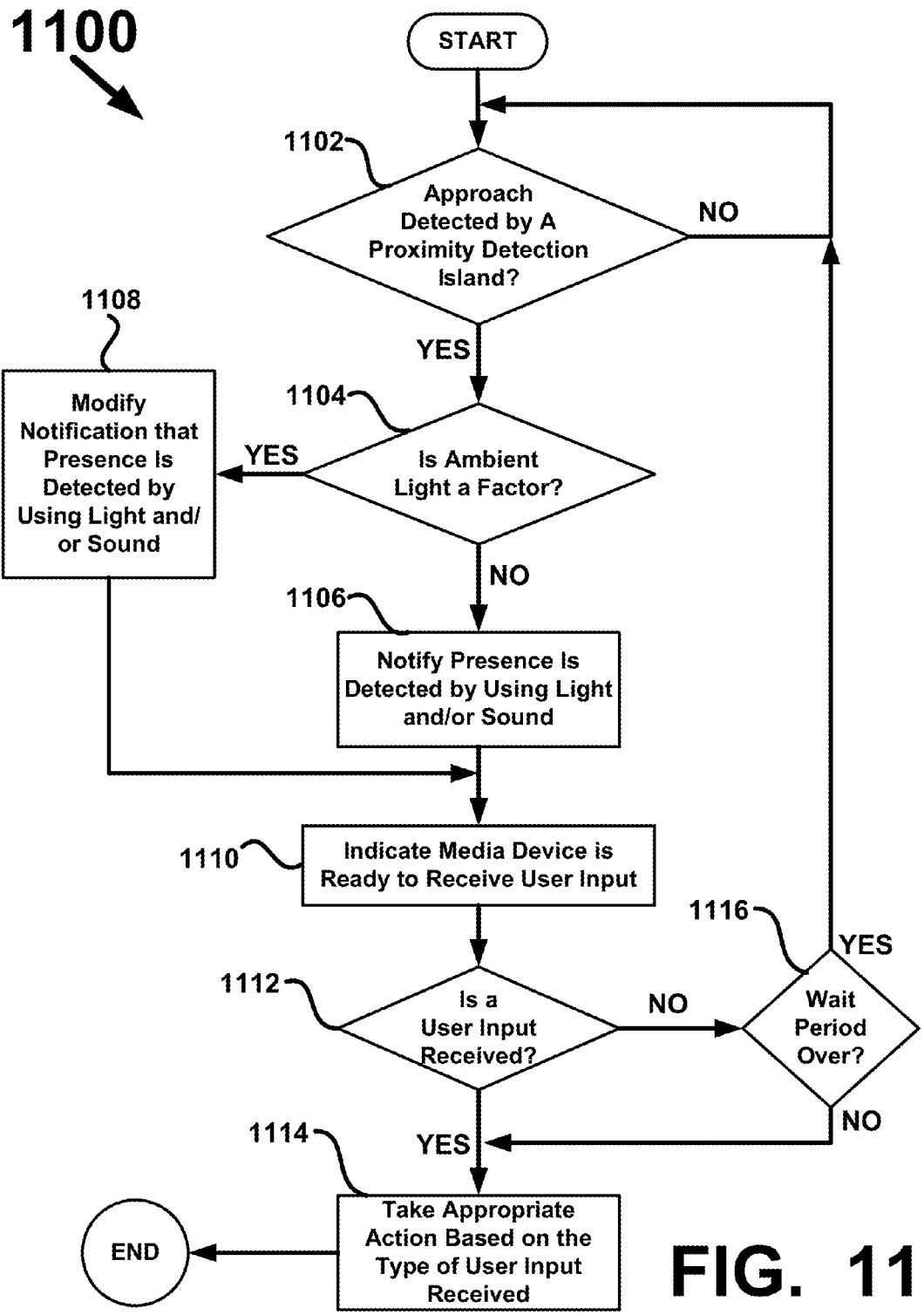
FIG. 11 depicts another example of a flow for presence detection, notification, and media device readiness according to embodiments of the present application.

FIG. 11 depicts another example of a flow 1100 for presence detection, notification, and media device readiness. At a stage 1102 a query as to whether an approach is detected by one or more of the proximity detection islands (e.g., I1, I2, I3, I4) is made. If one or more of the proximity detection islands have detected presence, then a YES branch is taken. If no presence is detected by one or more of the proximity detection islands, then a NO branch is taken and the flow 1100 may return to the stage 1102 to wait for one or more of the proximity detection islands to detect a presence. The YES branch takes flow 1100 to a stage 1104 where a query is made as to whether or not ambient light (e.g., ambient light 630 as detected by ALS 618 of FIG. 6) is a factor to be taken into consideration in the media devices response to having detected a presence at the stage 1102. If ambient light is not a factor, then a NO branch is taken and the flow 1100 continues to a stage 1106. If ambient light is a factor, then a YES branch is taken and flow 1100 continues at a stage 1108 where any notification by media device 100 in response to detecting presence at the stage 1102 is modified. One or more of light, sound, or vibration may be used by media device 100 to indicate to a user that its presence has been detected. The light, sound, or vibration are altered to comport with the ambient light conditions, such as described above in regard to ambient light 630 in FIG. 9, for example. At the stage 1106, notification of presence being detected occurs using one or more of light, sound, or vibration without modification. At a stage 1110, the media device 100 indicates that it is ready to receive input from a user and/or user device (e.g., user 201 or a user device 220 via RF 107). At a stage 1112 a query is made as to whether or not an input is received from a user. If an input is received from the user and/or user device, then a YES branch is taken to a stage 1114 where the media device 100 takes an appropriate action based on the type of user input received and the flow may terminate after the stage 1114. If no input is received from the user and/or user device, then a NO branch is taken and the flow 1110 may continue at a stage 1116 where flow 1100 may enter into a wait period of predetermined time (e.g., of approximately 15 seconds or one minute, etc.). If a user input is received before the wait period is over, then a NO branch may be taken to the stage 1114. If the wait period is over, then a YES branch may be taken and flow 1100 may resume at the stage 1102. Actions taken at the stage 1114 may include those described above in reference to FIG. 10.

Figure 12:
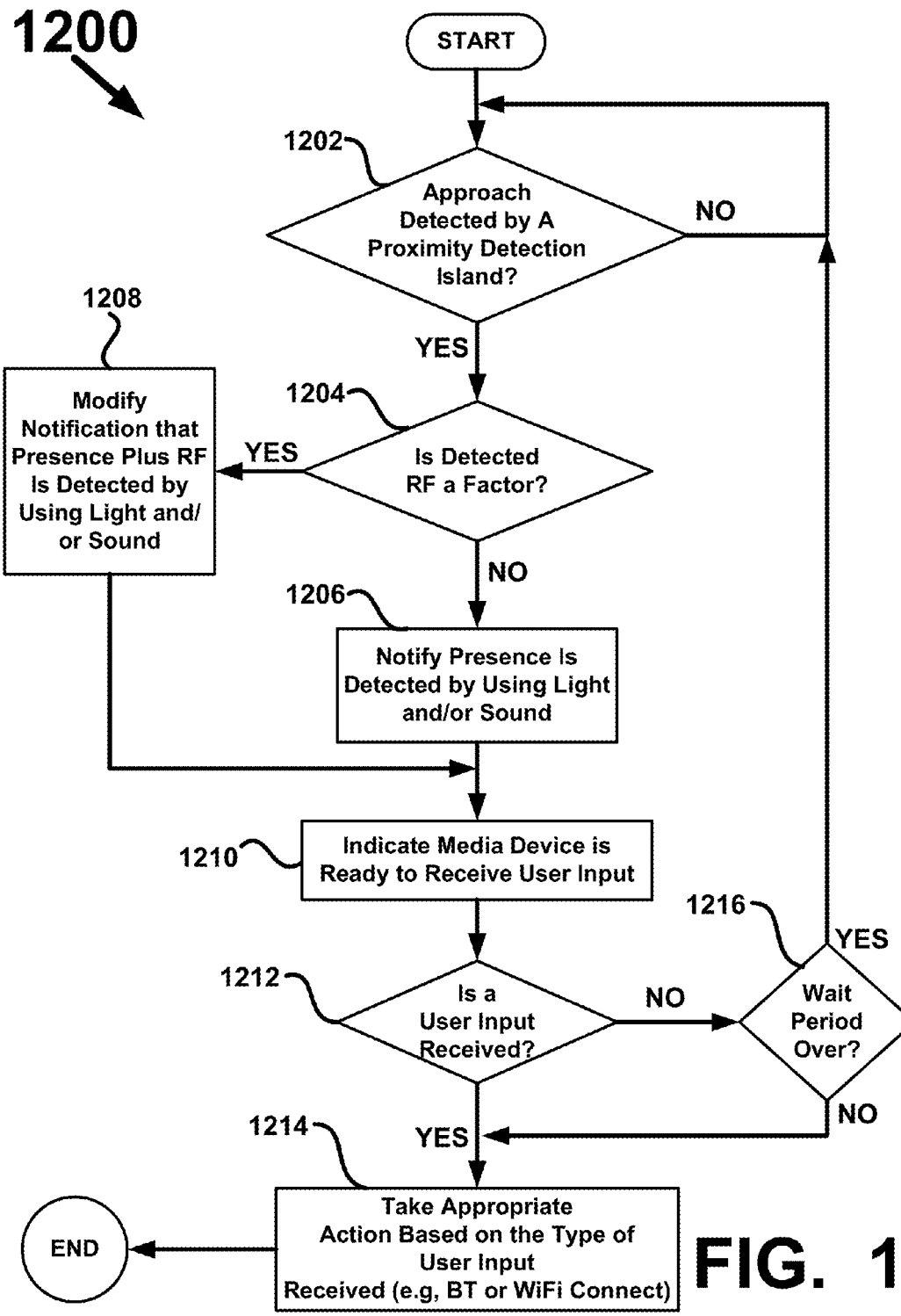
FIG. 12 depicts yet another example of a flow for presence detection, notification, and media device readiness according to embodiments of the present application.

FIG. 12 depicts yet another example of a flow 1200 for presence detection, notification, and media device readiness. At a stage 1202 a query as to whether an approach is detected by one or more of the proximity detection islands (e.g., I1, I2, I3, I4) is made. If one or more of the proximity detection islands have detected presence, then a YES branch is taken. If no presence is detected by one or more of the proximity detection islands, then a NO branch is taken and the flow 1200 may return to the stage 1202 to wait for one or more of the proximity detection islands to detect a presence. The YES branch takes flow 1200 to a stage 1204 where a query is made as to whether or not detection of RF (e.g., by RF 107 using antenna 124) is a factor to be taken into consideration in the media devices response to having detected a presence at the stage 1202. If RF detection is not a factor, then a NO branch is taken and the flow 1200 continues to a stage 1206. If RF detection is a factor, then a YES branch is taken and flow 1200 continues at a stage 1208 where any notification by media device 100 in response to detecting presence at the stage 1202 is modified. One or more of light, sound, or vibration may be used by media device 100 to indicate to a user that its presence has been detected. The light, sound, or vibration are altered to comport with the detection of RF (e.g., from a user device 220), such as described above in regards to user device 220 in FIG. 9, for example. At the stage 1206, notification of presence being detected occurs using one or more of light, sound, or vibration without modification. At a stage 1210, the media device 100 indicates that it is ready to receive input from a user and/or user device (e.g., user 201 or a user device 220 via RF 107). At a stage 1212 a query is made as to whether or not an input is received from a user. If an input is received from the user and/or user device, then a YES branch is taken to a stage 1214 where the media device 100 takes an appropriate action based on the type of user input received and the flow may terminate after the stage 1214. If no input is received from the user and/or user device, then a NO branch is taken and the flow 1200 may continue at a stage 1216 where flow 1200 may enter into a wait period of predetermined time (e.g., of approximately 15 seconds or one minute, etc.). If a user input is received before the wait period is over, then a NO branch may be taken to the stage 1214. If the wait period is over, then a YES branch may be taken and flow 1200 may resume at the stage 1202. Actions taken at the stage 1214 may include those described above in reference to FIGS. 9 and 10.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A method for proximity-based control, comprising:
   detecting an approach of a user using a proximity detection island positioned on a media device;
   notifying the user, using one or more of light, sound, or vibration, that a presence of the user has been detected by the proximity detection island;
   indicating that the media device is ready to receive input from the user;
   waiting for input from the user; and
   taking an action based on a type of input received from the user.

2. The method of claim 1 and further comprising:
   determining, using an ambient light sensor, if ambient light indicates the approach.

3. The method of claim 2 and further comprising:
   modifying the notifying when the ambient light indicates the approach.

4. The method of claim 2, wherein the ambient light comprises light in an environment in which the media device is positioned.

5. The method of claim 1 and further comprising:
   determining, using a radio frequency system, if a radio frequency transmission detected by the radio frequency system indicates the approach.

6. The method of claim 5 and further comprising:
   modifying the notifying when the radio frequency transmission detected by the radio frequency system indicates the approach.

7. The method of claim 5, wherein the action taken is based on a type of radio frequency transmission detected by the radio frequency system.

8. The method of claim 5, wherein the radio frequency transmission is transmitted by a user device.

9. A device, comprising:
   a controller in electrical communication with
      a data storage system including non-volatile memory,
      an input/output system,
      a radio frequency system including at least one radio frequency antenna electrically coupled with a first transceiver being configured to wirelessly communicate using a first protocol,
      a second transceiver being configured to wirelessly communicate using a second protocol that is different than the first protocol, and
      an ad hoc transceiver being configured to wirelessly communicate only with other devices having the ad hoc transceiver using a third protocol that is different than the first and second protocols,
      an audio/video system including a loudspeaker electrically coupled with a power amplifier and a microphone electrically coupled with a preamplifier, and
      a proximity detection island including an infrared light-emitting diode electrically coupled with first driver circuitry, a photosensitive diode electrically coupled with a first analog-to-digital-converter, a red-green-blue light-emitting diode electrically coupled with second driver circuitry, and an optically transmissive structure being configured to bi-directionally pass light.

10. The device of claim 9 and further comprising:
    capacitive touch circuitry included in the proximity detection island and electrically coupled with the optically transmissive structure, the capacitive touch circuitry being configured to generate a signal indicative of a change in capacitance caused by the optically transmissive structure being touched.

11. The device of claim 9 and further comprising:
    an ambient light sensor included in the proximity detection island and electrically coupled with circuitry that is in electrical communication with a second analog-to-digital-converter.

12. The device of claim 9, wherein the proximity detection island is configured to detect a user presence within a detection range of the proximity detection island.

13. The device of claim 12, wherein detection of the user presence includes using the radio frequency system to detect a radio frequency transmission from a user device.

14. The device of claim 9, wherein the second driver circuitry is configured to activate the red-green-blue light-emitting diode to emit a color of light upon detection of a user presence by the proximity detection island.

15. The device of claim 9 and further comprising:
    a plurality of control elements electrically coupled with the input/output system, each control element being configured to generate a signal indicative of actuation of the control element.

16. The device of claim 15, wherein one or more of the plurality of control elements comprise capacitive touch switches.

17. The device of claim 15, wherein one or more of the plurality of control elements are backlit.

18. The device of claim 17, wherein the one or more of the plurality of control elements that are backlit, emit light when a user presence is detected by the proximity detection island.

19. The device of claim 9, wherein the proximity detection island is associated with a specific function, the specific function being enabled when the proximity detection island detects a user presence.

20. The device of claim 9 and further comprising:
    a plurality of the proximity detection islands, each proximity detection island being configured to operate independently of other proximity detection islands in the plurality of the proximity detection islands.

* * * * *